US012610373B2

(12) United States Patent
Xu et al.

(10) Patent No.: US 12,610,373 B2
(45) Date of Patent: Apr. 21, 2026

(54) SCALING OF PHYSICAL DOWNLINK AND UPLINK SHARED CHANNEL TRANSPORT BLOCKS FOR SELECT FREQUENCY BANDS

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 818 days.

(21) Appl. No.: 17/912,005

(22) PCT Filed: Apr. 2, 2020

(86) PCT No.: PCT/CN2020/083002
§ 371 (c)(1),
(2) Date: Sep. 15, 2022

(87) PCT Pub. No.: WO2021/196130
PCT Pub. Date: Oct. 7, 2021

(65) Prior Publication Data
US 2023/0137215 A1 May 4, 2023

(51) Int. Cl.
*H04W 72/232* (2023.01)
*H04L 5/00* (2006.01)

(52) U.S. Cl.
CPC ......... *H04W 72/232* (2023.01); *H04L 5/0092* (2013.01)

(58) Field of Classification Search
CPC ........................... H04W 72/232; H04L 5/0092
See application file for complete search history.

(56) References Cited

U.S. PATENT DOCUMENTS

| | | | |
|---|---|---|---|
| 9,877,344 B2 | 1/2018 | Zhang et al. | |
| 10,291,378 B1 | 5/2019 | Bai et al. | |
| 2018/0368090 A1 | 12/2018 | Kadambar et al. | |
| 2019/0082431 A1* | 3/2019 | Yi ........................ | H04L 5/0055 |
| 2019/0312708 A1 | 10/2019 | Bai et al. | |

(Continued)

FOREIGN PATENT DOCUMENTS

| | | | | |
|---|---|---|---|---|
| CN | 110463097 A | | 11/2019 | |
| CN | 111436154 A | * | 7/2020 | ............ H04W 72/23 |

(Continued)

OTHER PUBLICATIONS

Panasonic: "On PUSCH enhancements for NR URLLC", R1-1910521, 3rd Generation Partnership Project, Mobile Competence Centre, 650, Route Des Lucioles, F-06921 Sophia-Antipolis Cedex, FR, vol. RAN WG1, No. Chongqing, China, Oct. 14, 2019-Oct. 20, 2019, Oct. 2, 2019, 9 Pages. XP051808039.

(Continued)

*Primary Examiner* — Samina F Choudhry
(74) *Attorney, Agent, or Firm* — Loza & Loza, LLP

(57) ABSTRACT

Aspects of the disclosure relate to transport block (TB) scaling in the physical uplink shared channel (PUSCH) and physical downlink shared channel (PDSCH) for select frequency bands, such as new radio unlicensed (NR-U) bands where the allowed power spectral density may be lower.

23 Claims, 18 Drawing Sheets

(56) References Cited

U.S. PATENT DOCUMENTS

| | | | | |
|---|---|---|---|---|
| 2019/0313426 A1 * | 10/2019 | Lin | ...................... | H04W 72/12 |
| 2019/0349116 A1 * | 11/2019 | Hosseini | .............. | H04L 1/0011 |
| 2019/0349978 A1 | 11/2019 | Lin et al. | | |
| 2022/0094461 A1 * | 3/2022 | Dinan | .................... | H04L 1/001 |

FOREIGN PATENT DOCUMENTS

| | | | | | |
|---|---|---|---|---|---|
| EP | 3861663 | A1 | 8/2021 | | |
| WO | 2017065879 | A1 | 4/2017 | | |
| WO | WO-2017183870 | A2 * | 10/2017 | .......... | H04W 74/006 |
| WO | 2018031083 | A1 | 2/2018 | | |
| WO | WO-2018230694 | A1 * | 12/2018 | ........... | H04W 72/23 |
| WO | WO-2020033785 | A1 * | 2/2020 | ........... | H04L 5/0053 |
| WO | WO-2020033968 | A1 * | 2/2020 | ........... | H04L 5/0007 |
| WO | 2020070722 | A1 | 4/2020 | | |

OTHER PUBLICATIONS

Spreadtrum Communications: "Discussion on PUSCH enhance-ments for URLLC", R1-1910019, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 1, 2019, pp. 1-6, XP051808006, Section 2.3.

Supplementary European Search Report—EP20928975—Search Authority—The Hague—Dec. 11, 2023.

International Search Report and Written Opinion—PCT/CN2020/083002—ISA/EPO—Jan. 7, 2021.

ZTE: "Outcome of Email Thread [100e-NR-2step-RACH-Procedure-03]", 3GPP TSG-RAN WG1 Meeting #100, R1-2001229, E-Meeting, Feb. 24-Mar. 6, 2020, 4 Pages, Section 5.1.3.2.

* cited by examiner

800

900

1000

Start

Determine a transport block (TB) scaling factor used for setting a transport block (TB) size for a physical downlink shared channel (PDSCH);    1002

Encode the scaling factor with a timed domain resource allocation (TDRA);    1004

Transmit the TDRA with the scaling field with the scaling factor used for the TB size to at least one user equipment (UE)    1006

End

1100

1200

1400

1500

1700

1800

Start

Receive an RRC configuration via RRC signaling from a base station including transport block (TB) scaling information for use in uplink (UL) transmissions — 1802

Determine TB size for a physical uplink shared channel (PUSCH). based on the TB scaling information in the RRC configuration — 1804

End

SCALING OF PHYSICAL DOWNLINK AND UPLINK SHARED CHANNEL TRANSPORT BLOCKS FOR SELECT FREQUENCY BANDS

CROSS-REFERENCE TO RELATED APPLICATION(S)

This application is the U.S. national stage of PCT patent application number PCT/CN2020/083002 filed on Apr. 2, 2020.

TECHNICAL FIELD

The technology discussed herein relates generally to wireless communication systems and, more particularly, to transport block (TB) scaling in the physical uplink shared channel (PUSCH) and physical downlink shared channel (PDSCH) for select frequency bands, such as new radio unlicensed (NR-U) bands.

BACKGROUND

Wireless communication systems being developed (e.g., 5G NR) are increasingly looking to utilize unlicensed bands, such as the 5 GHz or 6 GHz bands (e.g., NR-U). The power spectral density (PSD) for bands such as 6 GHz, however, may be limited to protect incumbent devices (e.g., video camera) within wireless devices, with the limitation being 10 dBm/MHz or lower than current 5 GHz bands' PSD for both gNodeBs (gNBs) and user equipment (UE). As the PSD in such bands may be limited, the total transmit power allowed will also be limited by the bandwidth occupied. Additionally, certain standards such as Release 16 of 3GPP's NR standard, have assumed that a 20 MHz bandwidth is sufficient for transmit power. However, Release 16 introduced an uplink (UL) interlace waveform for the physical uplink control channel (PUCCH) and shared channel (PUSCH) and limited the PUCCH to the 20 MHz bandwidth, as well as further introducing a wideband physical random access channel (PRACH) that is also limited to a 20 MHz bandwidth. Assuming a low PSD limitation for NR unlicensed band systems (e.g., 11 dB lower at the UE side and 5 dB lower at the gNB side), it is evident that the available resources are reduced.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for wireless communication at a base station in a wireless communication network is disclosed. The method includes configuring a scaling field within downlink control information (DCI) to indicate a scaling factor corresponding to a transport block (TB) size for one of a physical uplink shared channel (PUSCH) or a physical downlink shared channel (PDSCH), wherein the scaling field is disposed within an existing bit field in the DCI. Additionally, the method includes transmitting the DCI to at least one user equipment (UE).

Another example provides a method of wireless communication at a base station in a wireless communication network. The method includes adding one or more scaling bits within one or more fields of a random access resource (RAR) control element to indicate a scaling factor corresponding to a transport block (TB) size for a physical uplink shared channel (PUSCH). Furthermore, the method includes transmitting the RAR control element with the one or more scaling bits to at least one user equipment (UE).

In yet another example, a method of wireless communication at a base station in a wireless communication network is disclosed. The method includes determining a transport block (TB) scaling factor used for setting a transport block (TB) size for a physical downlink shared channel (PDSCH). Additionally, the method includes encoding the scaling factor with a timed domain resource allocation (TDRA); and transmitting the TDRA with the scaling field with the scaling factor used for the TB size to at least one user equipment (UE).

Another example provides a method of wireless communication at a base station in a wireless communication network including determining a transport block (TB) scaling factor for scaling a TB size for one of a physical uplink shared channel (PUSCH) or a physical downlink shared channel (PDSCH). The method further includes associating the TB scaling factor using a radio resource control (RRC) mechanism in the base station with at least one modulation coding scheme (MCS), and then transmitting the TB scaling via RRC configured signaling to at least one user equipment (UE).

According to another example, a method of wireless communication at a base station in a wireless communication network is disclosed including determining transport block (TB) scaling information usable for scaling a TB size for a physical uplink shared channel (PUSCH). The method further includes adding the TB scaling information to a radio resource control (RRC) configuration, and transmitting the RRC configuration via RRC signaling from the base station to a user equipment (UE) including the TB scaling information for use in uplink (UL) transmission.

Still another disclosed method provides for wireless communication at a user equipment (UE) in a wireless communication network. The method includes receiving downlink control information (DCI) from a base station, the DCI including a scaling field configured to indicate a scaling factor corresponding to a transport block (TB) size for one of a physical uplink shared channel (PUSCH) or a physical downlink shared channel (PDSCH), wherein the scaling field is further disposed within an existing bit field in the DCI. Also, the method includes determining a size of a transport block based on the scaling factor.

Another disclosed method provides for a method of wireless communication at a UE in a wireless communication network. The method includes receiving a random access resource (RAR) control element from a base station, the RAR including one or more scaling bits within one or more fields of the RAR control element configured to indicate a scaling factor corresponding to a transport block (TB) size for a physical uplink shared channel (PUSCH). Additionally, the method includes determining a size of a transport block based on the scaling factor.

According to yet another aspect, a method of wireless communication at a UE in a wireless communication network is disclosed that includes receiving a timed domain resource allocation (TDRA), the TDRA including a scaling field with a scaling factor used for setting a transport block (TB) size for a physical downlink shared channel (PDSCH).

The method also includes decoding the scaling factor within the TDRA, and determining a size of a TB based on the decoded scaling factor.

Another disclosed method provides for a method of wireless communication at a UE in a wireless communication network. The method includes receiving from a base station a transport block (TB) scaling factor for scaling a TB size for one of a physical uplink shared channel (PUSCH) or a physical downlink shared channel (PDSCH) via radio resource control (RRC) configured signaling, wherein the TB scaling factor is associated with at least one modulation coding scheme (MCS) using an RRC mechanism. Furthermore, the method includes determining a TB size based on the TB scaling factor.

According to another aspect, a method of wireless communication at a UE in a wireless communication network is disclosed. The method includes receiving an RRC configuration via RRC signaling from a base station including transport block (TB) scaling information for use in uplink (UL) transmissions. Additionally, the method includes determining a TB size for a physical uplink shared channel (PUSCH). based on the TB scaling information in the RRC configuration.

According to another aspect, a base station configured for wireless communication is disclosed. The base station includes a processor, a memory communicatively coupled to the processor, and a transceiver communicatively coupled to the processor. Further, the processor and the memory are configured to configure a scaling field within downlink control information (DCI) to indicate a scaling factor corresponding to a transport block (TB) size for one of a physical uplink shared channel (PUSCH) or a physical downlink shared channel (PDSCH), wherein the scaling field is disposed within an existing bit field in the DCI. Additionally, the processor and the memory are configured to transmit the DCI to at least one user equipment (UE).

According to another aspect, a UE configured for wireless communication is disclosed. The UE includes a processor, a memory communicatively coupled to the processor, and a transceiver communicatively coupled to the processor. Further, the processor and the memory are configured to receive downlink control information (DCI) from a base station, the DCI including a scaling field configured to indicate a scaling factor corresponding to a transport block (TB) size for one of a physical uplink shared channel (PUSCH) or a physical downlink shared channel (PDSCH), wherein the scaling field is further disposed within an existing bit field in the DCI. Also, processor and the memory are configured to determine a size of a transport block based on the scaling factor.

Another example provides a base station configured for wireless communication. The base station includes means for configuring a scaling field within downlink control information (DCI) to indicate a scaling factor corresponding to a transport block (TB) size for one of a physical uplink shared channel (PUSCH) or a physical downlink shared channel (PDSCH), wherein the scaling field is disposed within an existing bit field in the DCI. Additionally, the base station includes means for transmitting the DCI to at least one user equipment (UE).

Still another example provides a user equipment (UE) configured for wireless communication. The UE includes means for receiving downlink control information (DCI) from a base station, the DCI including a scaling field configured to indicate a scaling factor corresponding to a transport block (TB) size for one of a physical uplink shared channel (PUSCH) or a physical downlink shared channel (PDSCH), wherein the scaling field is further disposed within an existing bit field in the DCI. Also, the UE includes means for determining a size of a transport block based on the scaling factor.

Another example provides a computer readable medium storing computer executable code including instructions for causing a base station to configure a scaling field within downlink control information (DCI) to indicate a scaling factor corresponding to a transport block (TB) size for one of a physical uplink shared channel (PUSCH) or a physical downlink shared channel (PDSCH), wherein the scaling field is disposed within an existing bit field in the DCI. Additionally, the computer executable code includes instructions for causing the base station to transmit the DCI to at least one user equipment (UE).

Another example provides a computer readable medium storing computer executable code including instructions for causing a UE to receive downlink control information (DCI) from a base station, the DCI including a scaling field configured to indicate a scaling factor corresponding to a transport block (TB) size for one of a physical uplink shared channel (PUSCH) or a physical downlink shared channel (PDSCH), wherein the scaling field is further disposed within an existing bit field in the DCI. Also, the computer executable code includes instructions for causing the UE to determine a size of a transport block based on the scaling factor.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

Figure 1:
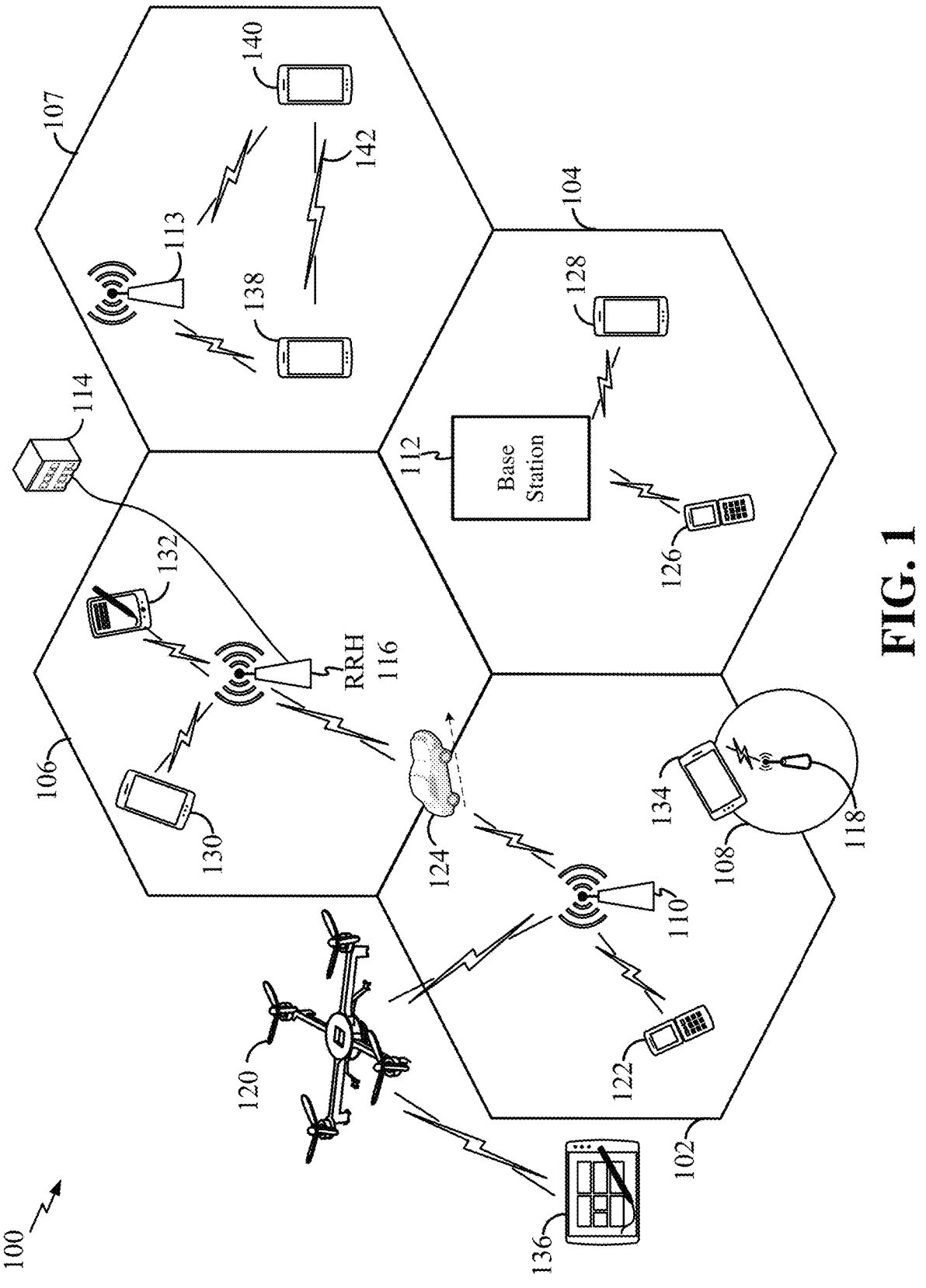
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In wireless communication systems that utilize unlicensed bands such as the 6 GHz band, it is anticipated that power spectrum density (PSD) limitations may be imposed on such bands. For example, the PSD limitations may be 5 dBm/MHz for gNBs and −1 dBm/MHz for UEs, which are substantially lower than current 5 GHz PSD limitations (e.g., 10 dBm/MHz for both gNB and UE). As mentioned before, such limitations will result in the effect that the total transmit power allowed will be limited by the bandwidth occupied.

Given the potential very low PSD limitations of the 6 GHz band (e.g., 11 dB lower at UE side and 5 dB lower at gNB side than the current 5 GHz band) and the disparity between the uplink (UL) and downlink (DL) (i.e., a relative 6 dB difference between UL and DL), this presents challenges to balance the resource allocation between the DL and UL. In order to increase the transmit power, the only way is to transmit the signal with wider bandwidth (i.e., the signal needs to occupy each MHz in bandwidth of frequencies). For PDSCH and PUSCH channels in 5G NR, this may already be done by scheduling. Notwithstanding, in 5G NR the transport block (TB) size scales with the size of frequency domain resource allocation, and the use of a smaller assignment cannot then boost power anymore. In this case, a large assignment in the frequency domain with higher coding gain (e.g., a higher modulation coding scheme (MCS)) would be needed. Again, however, in 5G NR a larger assignment implies a larger transport block size (TBS) given the same modulation coding scheme (MCS). Accordingly, some TB size adjustment (i.e., TB size reduction) may be useful to lower the coding rate or gain, similar to what is done for P-RNTI and RA-RNTI DCI 1_0 with a TB scaling field. Of further note, according to releases 15 and 16 for 5G NR, a TB scaling field is two (2) bits for P-RNTI, RA-RNTI and msgB-RNTI for DCI 1_0, with the scaling of the TB allowed to be scaled down by a factor of ½ (0.5) or ¼ (0.25). Accordingly, the present disclosure provides for further transport block (TB) scaling by providing a scaling factor, scaling bits, and/or a scaling field through various mechanisms, particular for systems operating in unlicensed bands (e.g. NR-U bands) such as 6 GHz.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a wireless system 100 of one or more radio access networks (RANs) is provided. The RANs may implement any suitable wireless communication technology or technologies to provide radio access. As one example, a RAN may operate according to 3GPP New Radio (NR) specifications, often referred to as 5G or 5G NR. As another example, a RAN may operate under a hybrid of 5G NR and Evolved Universal Terrestrial Radio Access Network (eUTRAN) standards, often referred to as LTE. 3GPP refers to this hybrid RAN as a next-generation RAN, or NG-RAN. Of course, many other examples may be utilized within the scope of the present disclosure.

The geographic region covered by the one or more radio access networks shown in illustration 100 may be divided into a number of cellular regions (cells) that can be uniquely identified by a user equipment (UE) based on an identification broadcasted over a geographical area from one access point or base station. FIG. 1 illustrates macrocells 102, 104, 106, and 107 and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, three base stations 110, 112, and 113 are shown in cells 102, 104, and 107, respectively; and a further base station 114 is shown controlling a remote radio head (RRH) 116 in cell 106. A base station can have an integrated antenna or can be connected to an antenna or RRH by feeder cables. In the illustrated example, the cells 102, 104, 106, and 107 may be referred to as macrocells, as the base stations 110, 112, 113, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 113, 114, and 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown in this figure) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The one or more RANs shown in illustration of wireless system 100 are illustrated supporting wireless communication for multiple mobile apparatuses. A mobile apparatus is commonly referred to as user equipment (UE) in standards and specifications promulgated by 3GPP, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

The cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; UEs 138 and 140 may be in communication with base station 113, as well as with each other over a sidelink (SL) 142; and UE 136 may be in communication with mobile base station 120. Here, each base station 110, 112, 113, 114, 118, and 120 may be configured to provide an access point to a core network (not shown) for all the UEs in the respective cells. In another example, a mobile network node (e.g., quadcopter 120) may be configured to function as a UE. For example, the quadcopter 120 may operate within cell 102 by communicating with base station 110.

Wireless communication between a RAN and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a base station (e.g., base stations 110, 112, or 113). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a UE (e.g., UE 122).

According to aspects, DL transmissions may include unicast or broadcast transmissions of control information and/or data (e.g., user data traffic or other type of traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the one or more radio access networks of FIG. 1 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the radio access networks of FIG. 1 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the wireless system 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, 113, or 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, 132, 138, and 140 may receive the unified synchronization signals, derive the carrier frequency and radio frame timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the one or more RANs in wireless system 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the RANs in wireless system 100 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In some examples, access to the air interface may be scheduled, wherein a scheduling entity (e.g., a base station) allocates resources (e.g., time—frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Figure 2:
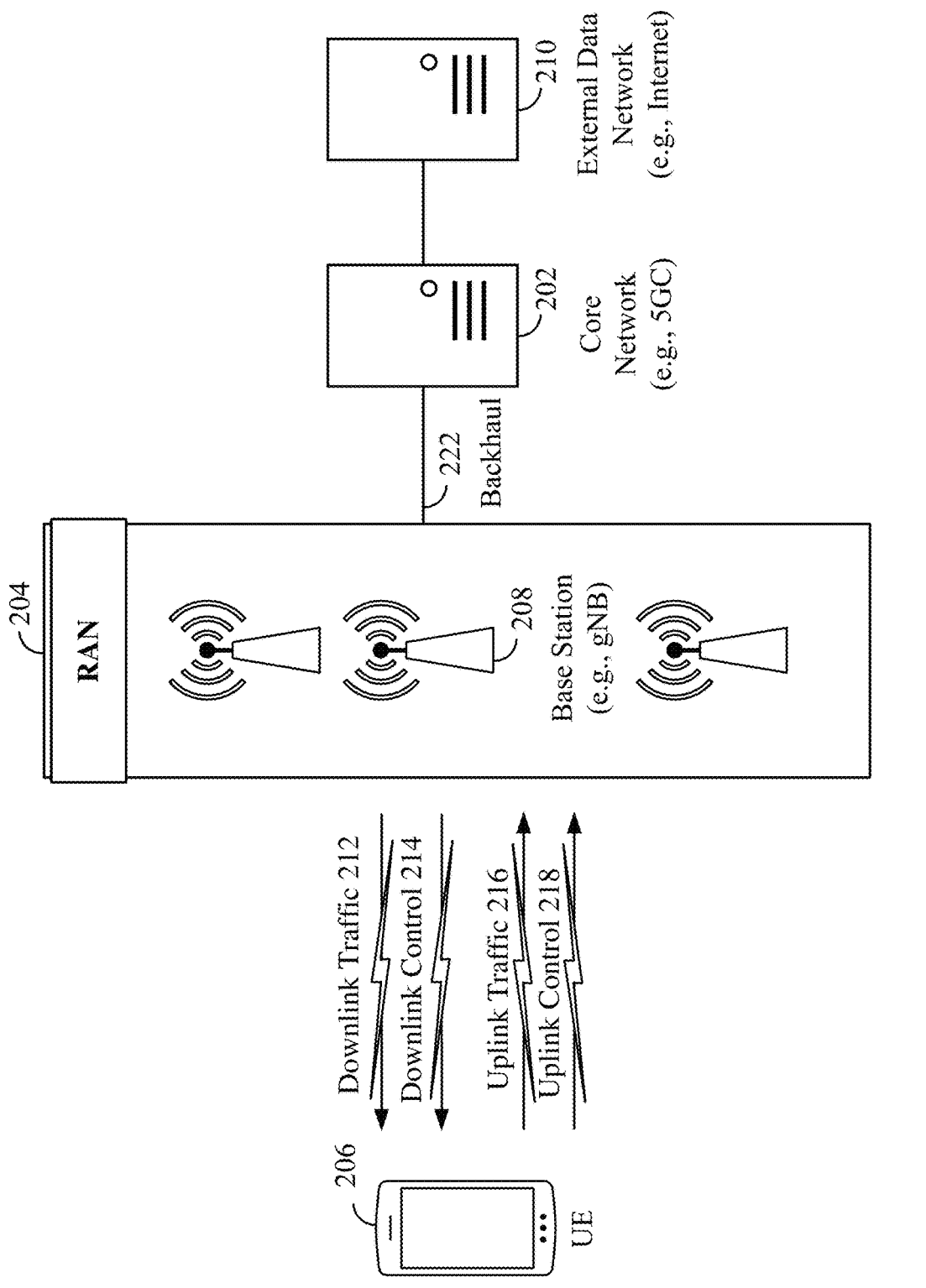
FIG. 2 is a conceptual illustration of an example of a radio access network according to some aspects.

FIG. 2, as another illustrative example without limitation, illustrates various aspects of the present disclosure are illustrated with reference to a wireless communication system 200. The wireless communication system 200 includes three interacting domains: a core network 202, a radio access network (RAN) 204, and one or more user equipment (UE) 206a and/or 206b. By virtue of the wireless communication system 200, the UEs 206a and 206b may be enabled to carry out data communication with an external data network 210, such as (but not limited to) the Internet.

The RAN 204 may implement any suitable wireless communication technology or technologies to provide radio access to the UEs 206a and 206b. As one example, the RAN 204 may operate according to 5G NR. As another example, the RAN 204 may operate under a hybrid of 5G NR and Evolved Universal Terrestrial Radio Access Network (eU-TRAN) standards, often referred to as LTE, such as in non-standalone (NSA) systems including EN-DC systems. The 3GPP also refers to this hybrid RAN as a next-generation RAN, or NG-RAN. Additionally, many other examples may be utilized within the scope of the present disclosure.

As illustrated in FIG. 2, the RAN 204 includes a plurality of base stations 208. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The RAN 204 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

For purposes of the present disclosure, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 204 and a UE 206*a* or 206*b* may be described as utilizing an air interface. Transmissions over the air interface from a base station (e.g., base station 208) to a UE 206 may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from UE 206 to a base station (e.g., base station 208) may be referred to as uplink (UL) transmissions. In accordance with further aspects of the present disclosure, the term uplink may refer to a point-to-point transmission originating at a UE (e.g., UE 206).

In some examples, access to the air interface may be scheduled, wherein a scheduling entity (e.g., a base station 208) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 206, which may be scheduled entities, may utilize resources allocated by the scheduling entity 208.

As illustrated in FIG. 1, a base station or scheduling entity 208 may broadcast downlink traffic 212 to one or more scheduled entities 206. Broadly, the base station or scheduling entity 208 may be configured as a node or device responsible for scheduling traffic in a wireless communication network, including the downlink traffic 212 and, in some examples, uplink traffic 216 from one or more scheduled entities 206 to the scheduling entity 208. The UE or scheduled entity 206 may be configured as a node or device that also receives downlink control information 214, including but not limited to scheduling information (e.g., a grant), synchronization or timing information, or other control information from another entity in the wireless communication network such as the scheduling entity 208. Furthermore, the UEs 206 may send uplink control information 218 to the base station 208 including but not limited to scheduling information (e.g., grants), synchronization or timing information, or other control information.

In general, base stations 208 may include a backhaul interface for communication with a backhaul portion 222 of the wireless communication system. The backhaul 222 may provide a link between a base station 208 and the core network 202. Further, in some examples, a backhaul network may provide interconnection between the respective base stations 208. Various types of backhaul interfaces may be employed, such as a direct physical connection, a virtual network, or the like using any suitable transport network.

The core network 202 may be a part of the wireless communication system 200, and may be independent of the radio access technology used in the RAN 204. In some examples, the core network 202 may be configured according to 5G standards (e.g., 5GC). In other examples, the core network 202 may be configured according to a 4G evolved packet core (EPC), or any other suitable standard or configuration.

In some examples, access to the air interface may be scheduled, wherein a scheduling entity (e.g., a base station 208) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UE 206, which may be a scheduled entity, may utilize resources allocated by the base station or scheduling entity 208.

Base stations are not the only entities that may function as a scheduling entity. That is, in some examples, a UE may function as a scheduling entity, scheduling resources for one or more scheduled entities (e.g., one or more other UEs). In other examples, two or more UEs (e.g., UEs 138 and 140 in FIG. 1 or UE 206 in FIG. 2) may communicate with each other using sidelink signals 142 or 220 without conveying that communication through a base station (e.g., base station 113 or 208) and without necessarily relying on scheduling or control information from a base station.

Various aspects of the present disclosure will be described with reference to an OFDM waveform, schematically illustrated in FIG. 3. It should be understood by those of ordinary skill in the art that the various aspects of the present disclosure may be applied to other waveforms such as an SC-FDMA waveform in substantially the same way as described below. While some examples in FIG. 3 of the present disclosure may focus on an OFDM link for clarity, it should be understood that the same principles may be applied to other waveforms.

Figure 3:
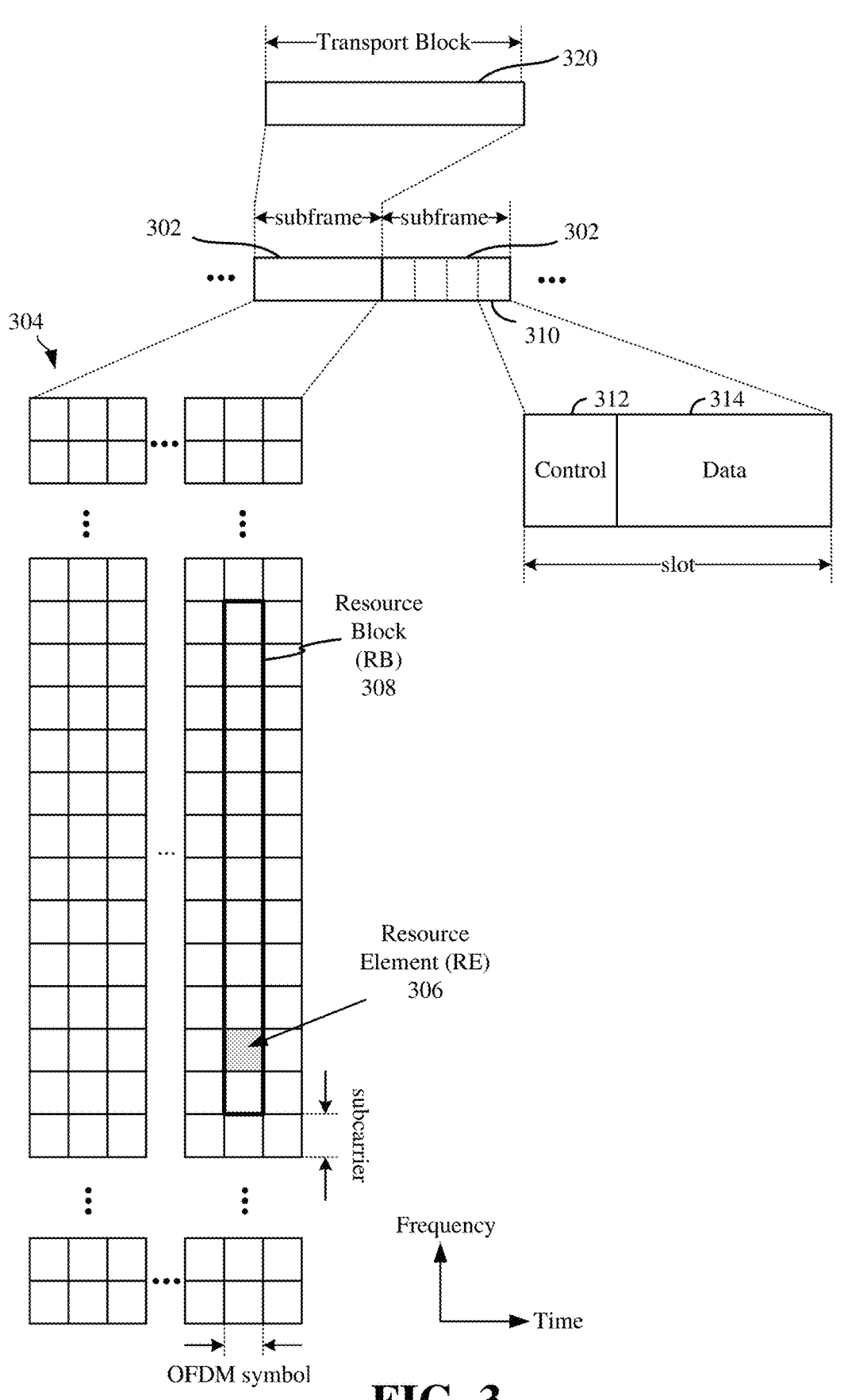
FIG. 3 is a schematic illustration of an organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time—frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

Scheduling of UEs (e.g., scheduled entities) for downlink, uplink, or sidelink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station or may be self-scheduled by a UE implementing D2D or relay sidelink communication.

In this illustration, the RB 308 is shown as occupying less than the entire bandwidth of the subframe 302, with some subcarriers illustrated above and below the RB 308 in frequency. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 2, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast or unicast communication. For example, a broadcast or multicast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In a DL transmission, the transmitting device may allocate one or more REs 306 (e.g., within a control region 312) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above in connection with FIGS. 1 and 2 are not necessarily all of the channels or carriers that may be utilized between a base station or scheduling entity and UEs or scheduled entities, and those of ordinary skill in the art will recognize that other channels or carriers may be utilized in addition to those illustrated, such as other traffic, control, and feedback channels.

Further, the physical channels described above are generally multiplexed and mapped to transport channels for handling at the medium access control (MAC) layer. Transport channels carry blocks of information called transport blocks (TB), which were mentioned above. As an illustration, an exemplary MAC layer transport block 320 is shown mapped to subframe 302 in FIG. 3, but is not limited to such mapping and this is only for illustration purposes to demonstrate a certain mapping. The transport block size (TBS), which may correspond to a number of bits of information, can be a controlled parameter based on the modulation and coding scheme (MCS) and the number of RBs in a given transmission. As will be explained in more detail below, aspects of the present disclosure relate to scaling of the TBS, particularly for systems utilizing various bands that may have limited PSD, as well as UL interlaced waveforms that have been introduced for the PUCCH and PUSCH in 5G NR specifications.

According to certain standards, the TB size scales with the size of frequency domain resource allocation (FDRA). Moreover, using a smaller assignment of resources cannot boost power and the use of a larger assignment (in frequency domain) with higher coding gain is needed. According to Release 15 of the 5G NR standards, however, given the defined TBS calculation, a larger assignment implies a larger TBS given the same modulation coding scheme (MCS). Accordingly, TB size adjustment may be useful for lowering the coding rate, such as what is done in a paging radio network temporary identifier (P-RNTI) and random access radio network temporary identifier (RA-RNTI) DCI 1_0 with a TB scaling field. In Releases 15/16 of 5G NR, for example, there is a two bit TB scaling field for P-RNTI and RA-RNTI, and msgB-RNTI for DCI 1_0, that allows a TB to be scaled down by factors of 1, 0.5 (½), or ¼ (0.25). In some aspects, the present disclosure provides for TB scaling using various methods and apparatus to communicate such TB scaling in NR-U systems using existing capacity/resources or repurposing of resource to provide communication of a TB scaling field or TB scaling bits.

According to one aspect, it is noted that various existing locations in downlink control information (DCI) may be utilized to communicate TB scaling from a gNB to at least one UE. Here, a TB scaling field or TB scaling bits scaling field may be utilized in DCI for both UL grants and DL grants, and with both fallback and non-fallback DCIs. It is also noted that, in certain aspects, the TB scaling indications may only be utilized for only lower or lowest modulation coding schemes (MCSs) where the need for reduction in coding rates through TB scaling is more acute.

Figure 4A:
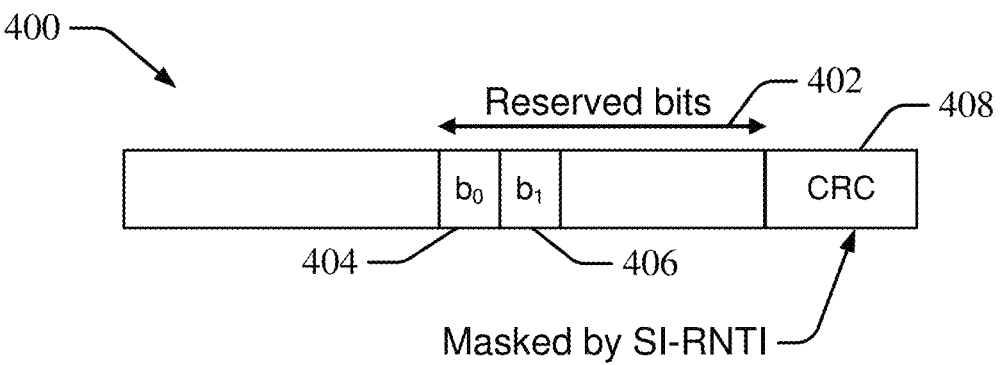
FIG. 4A is a block diagram illustrating an exemplary structure of downlink control information (DCI) for effecting transport block (TB) scaling according to some aspects.

FIG. 4A illustrates one example of DCI (or a portion thereof) 400 that features two scaling bits that are placed within existing reserved bits in the DCI. As illustrated, according to an aspect the DCI 400 includes a number of reserved bits indicated by range 402. In a particular aspect where a system information radio network temporary identifier (SI-RNTI) type is used with the DCI. In this example, as well as other types of DCIs, there is a range of reserved bits in the DCI such as range 402, which may be from 15 to 17 bits in some examples. Accordingly, two TB scaling bits within the range 402 and indicated as $b_0$ and $b_1$ (also 404 and 406) are selected for communicating TB scaling. Since two bits are used in this example, up to four values may be communicated. For example, binary value 00 may indicate a TB scaling factor of 1, binary value 01 may indicate a TB scaling factor of 0.5 (½), binary value 10 may indicate a TB scaling factor of 0.25 (¼), and binary value 11 may indicate a value of 0.125 (⅛). Additionally, DCI 400 may include cyclic redundancy check (CRC) bits masked or scrambled by SI-RNTI as indicated at 408.

Figure 4B:
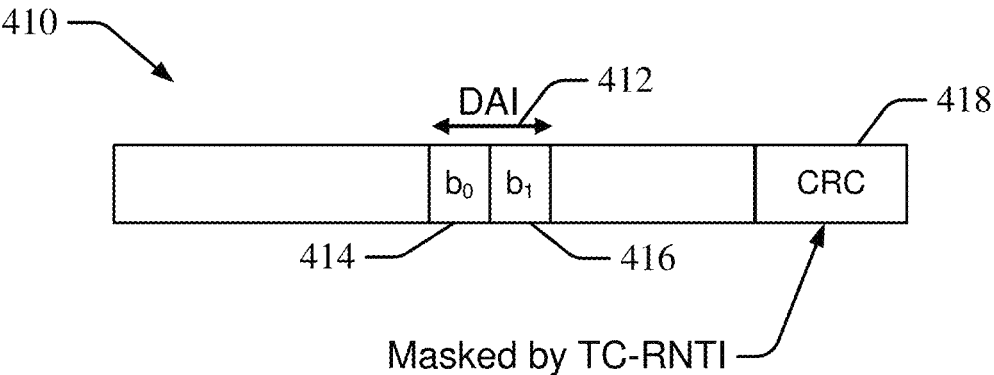
FIG. 4B is a block diagram illustrating an exemplary structure of a further downlink control information (DCI) for effecting transport block (TB) scaling according to some aspects.

FIG. 4B illustrates another example of DCI (or a portion thereof) 410 that features two scaling bits that may be placed within an existing bit field in the DCI. As illustrated, according to an aspect the DCI 410 includes a number of known bits. In a particular aspect where temporary cell RNTI (TC-RNTI) type is used with the DCI, there are at least two reserved bits in the DCI known as the downlink assignment index (DAI) indicated at 412. The DAI 412 is a TDD specific field that normally tells the UE the counts of downlink assignments scheduled for it within a given time frame. In this example, however, the two bit DAI field 412 is utilized for TB scaling bits indicated as $b_0$ and $b_1$ (also 414 and 416) are reserved for communicating TB scaling. Again, since two bits are used in this example, up to four values may be communicated (e.g., binary value 00 may indicate a TB scaling factor of 1, binary value 01 may indicate a TB scaling factor of 0.5 (½), binary value 10 may indicate a TB scaling factor of 0.25 (¼), and binary value 11 may indicate a value of 0.125 (⅛)). Additionally, DCI 400 may include cyclic redundancy check (CRC) bits masked or scrambled by TC-RNTI as indicated at 418.

Figure 4C:
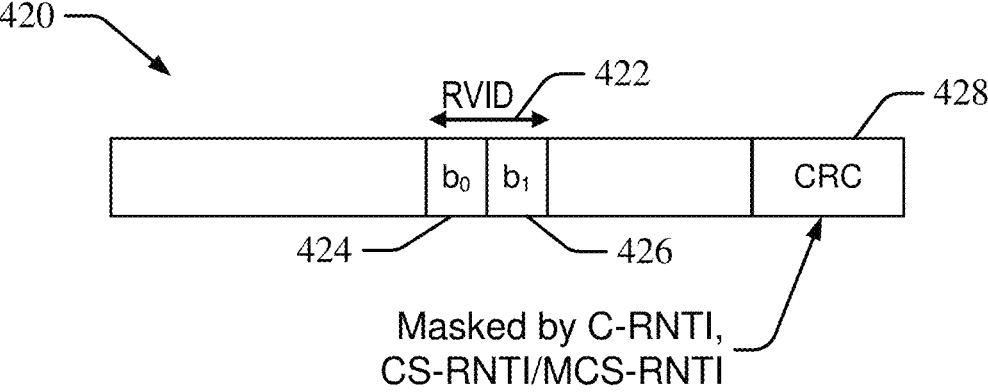
FIG. 4C is a block diagram illustrating an exemplary structure of yet another downlink control information (DCI) for effecting transport block (TB) scaling according to some aspects.

FIG. 4C illustrates another example of DCI (or portion thereof) 420 that features two scaling bits that may be placed within an existing information bit field in the DCI, which is repurposed for the TB scaling bits. In this example, it is noted that for low code rates, each redundancy version (RV) may include almost all the coded bits of a mother code. The coding gain from different RVs is most likely neglected. Therefore, a single RV in the DCI 420 may be sufficient size to use for the two bits of the TB scaling factor. In this case, two bits of RV identifier (RVID) RVO may be repurposed the existing DCI (e.g., 420) can be reserved by always transmitting this RVID. As illustrated, according to an aspect the DCI 420 includes two bits 424 and 426 in the RVID 422. Again, since two bits are used in this example, up to four values may be communicated (e.g., binary value 00 may indicate a TB scaling factor of 1, binary value 01 may indicate a TB scaling factor of 0.5 (½), binary value 10 may indicate a TB scaling factor of 0.25 (¼), and binary value 11 may indicate a value of 0.125 (⅛)). Additionally, DCI 400 may include cyclic redundancy check (CRC) bits masked or scrambled by C-RNTI/CS-RNTI/MCS-C-RNTI as indicated at 428.

In a further aspect, it is noted that the repurposing of RVID bits may be particularly applicable to instances of low MCS. In such case, the RRC may be used to configure an MCS threshold, below which a UE will be instructed or configured to reinterpret the RVID field of TB scaling. Alternatively, an RRC controlled flag could be utilized to indicate that a hard coded MCS value or lower will cause the UE to reinterpret the RVID for TB scaling.

According to further aspects, it is noted that when a gNB receives a physical random access channel (PRACH) from a UE to request an UL, the gNB will transmit a feedback random access resource (RAR) message to the UE. This RAR includes a time advance (TA), a UL-grant for message 3 (msg3), and TC-RNTI. To improve the link budget for the msg3 transmission, a TB scaling indication may be included in the UL-grant in the RAR. Accordingly, FIG. 5 illustrates an exemplary RAR structure 500 that may be used in providing TB scaling from a base station or gNB to a UE.

Figure 5:
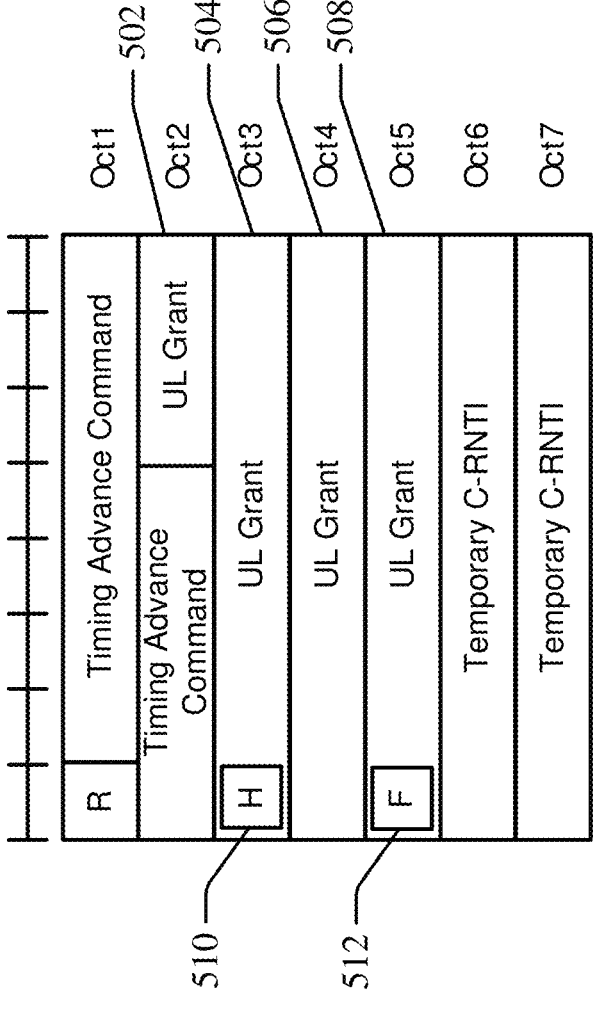
FIG. 5 is a diagram illustrating an exemplary random access resource (RAR) structure for effecting transport block (TB) scaling according to some aspects.

As may be seen in FIG. 5, the RAR 500 includes a number of 8 bit octets (e.g., Oct0 through Oct7). The TB scaling bits may be added to the RAR media access control element (MAC-CE) to indicate the TB scaling factor for the PUSCH scheduled by a UL-grant in this RAR 500, which may be seen as contained in octets 502, 504, 506, and 508. In particular, the example of FIG. 5 illustrates that two bits in the UL-grant in RAR 500 may be repurposed for the TB scaling bits. One of the bits 510 in octet 504, for example, which is a frequency hopping flag (i.e., 1 bit), is known to be disabled when an interlaced waveform is used. Accordingly, this bit 510 may be used or repurposed for one of the bits of the TB scaling bits (e.g., bit $b_0$).

Furthermore, one bit 512 from the frequency domain resource assignment (FDRA) in the UL grant may be used as the other TB scaling bit (e.g., $b_1$). It is noted that the FDRA may currently use 12 bits (note with already borrowed 2 bits for Channel Access-CPext (CAPC-Cpext)), but this many bits is not necessary if an interlaced waveform is used. Accordingly, bit 512 may be repurposed for use to transport a TB scaling bit (e.g., $b_1$).

Figure 6:
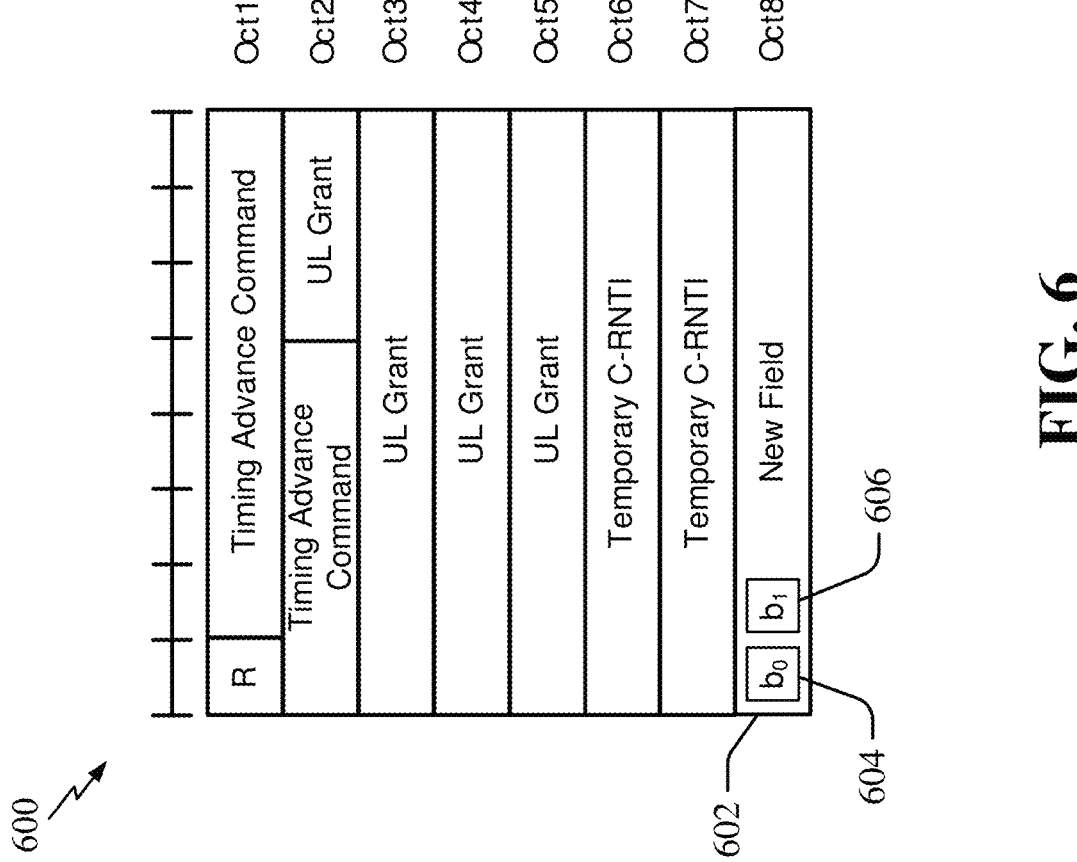
FIG. 6 is a diagram illustrating another exemplary RAR structure for effecting transport block (TB) scaling according to some aspects.

FIG. 6 illustrates another exemplary RAR structure 600 that may be used in communicating TB scaling from a base station or gNB to a UE. In this example, rather than repurpose bits in an existing RAR structure, at least two new bits for the TB scaling factor are introduced by adding another octet (8 bits) to the RAR 600. As illustrated in FIG. 6, a further octet 602 is added to RAR 600. At least two bits 604, 606 within this octet 602 contain TB scaling bits $b_0$ and $b_1$. Additionally, the addition of octet 602 adds the remaining six bits as further reserved bits at the same time, which may be utilized for other purposes. While the expansion of the RAR structure here does not impose too great of an additional loading burden on the PDSCH, in order to implement the RAR 600, does require defining a new MAC-CE.

According to further aspects, the TB scaling information or factor may be encoded jointly with the time division resource allocation (TDRA). Of note, this joint encoding may be particularly applicable for C-RNTI/CS-RNTI/MCS-C-RNTI cases. The joint encoding may involve either a reconfiguration of a TDRA table (i.e., TDRA configuration information) for a PDSCH to add the TB scaling information to the TDRA table or a hard coded change where a default TDRA is modified to be able to add the TB scaling information, such as through adding an additional column to the TDRA table.

In one aspect of joint encoding of the TB scaling information or factor and the TDRA information, one or more special TDRA table entries may defined taking into consideration the TB scaling factor and a start and length indicator (SLIV, which indicates the start symbol and length of a PUSCH) for the time domain resource allocation to ensure correct accounting of this information to determine the TB size for the PUSCH. In one aspect, the TDRA table may be reconfigured such that a new entry in the TDRA table may be introduced by a UE specific TDRA configuration.

In another alternative, a default TDRA may be modified for a particular band (e.g., 6 GHz) when coverage extension is needed. Here a remaining minimum system information (RMSI) may be used to configure the choice of the new default TDRA table.

In yet another alternative, rather than changing the TDRA, communication of TB scaling information or factors can be accomplished through associating the TB scaling with the MCS. In this alternative, the radio resource control (RRC) may configure (e.g., for an SIB or UE specific) to associate the TB scaling with the modulation coding scheme (MCS). Here, one or more MCSs may be associated with a particular TB scaling factor. For example, MCS values 0-2 could be associated with a ¼ TB scaling factor, MCS values 3-4 associated with a ½ TB scaling factor, and MCS values of five or more associated with a 1 TB scaling factor. In one aspect, this association could be applicable to all PUSCH or PDSCH channels regardless of the type of radio network temporary identifier (RNTI). In another aspect, the association of the TB scaling factor to the MCS value may be configured such that the association is only applied to DCIs received in a UE specific search space (USS), but not in a common search space (CSS).

In yet other aspects, it is noted that in the UL there are two types of configured grants (CGs) known as type 1 CG and type 2 CG. In a type 1 CG, the UL grant is configured by the RRC and, once configured, it is always active. A type 2 CG is first configured by the RRC, but then is additionally activated by the PDCCH scrambled with CS-RNTI before it can be utilized (e.g., an activation DCI). In the DL, semi-persistent scheduling (SPS) is used to allocate a UE with periodic DL assignments or UL grants (i.e., CGs) to serve a certain kind of traffic type that has a defined interval between when the packets have to be received and/or transmitted. The SPS resources are configured by the RRC with a given periodicity and the DL assignment that is scrambled with a specific CS-RNTI is then used for activation and deactivation of the resource (e.g., an activation DCI).

Thus, for type 2 CGs and DL SPS, an activation DCI is utilized and the previously described techniques for TB scaling can be applied using the activation DCI, in an example. For a type 1 CG for the UL, however, there is no activation DCI. Accordingly, various other techniques may be utilized to add TB scaling for such CGs. In a first aspect, TB scaling control may be added in the RRC configuration for type 1 CGs. This may be accomplished by adding a field in an information element (IE) for the CG configuration, and there is no definitive or tight requirement on the number of bits for the configuration. Accordingly, the TB scaling resolution can even be higher, instead of limited to merely 2 bits.

In another aspect, TB scaling control for a type 1 CG may be added for a msgA PUSCH configuration in common RRC signaling. Similar to the TB scaling added in the RRC above, there is not a tight requirement on the number of bits and the TB scaling control may have a greater resolution beyond just 2 bits. In still another aspect, the TB scaling for a msgA PUSCH may be linked to the PRACH repetition in the frequency domain. For example, if the PRACH is repeated four times in frequency, a TB scaling of four may be applied to msgA PUSCH.

In yet another aspect, for an RRC_CONNECTED UE, the UE may be further configured with TB scaling for the msgA PUSCH through dedicated RRC signaling. The dedicated RRC signaling can have better TB scaling control than the common RRC signaling or the default TB scaling linked to PRACH frequency domain repetition. Of note, in this aspect, if the TB scaling is not configured through the dedicated RRC signaling, the TB scaling would simply follow RRC common signaling or be tied to PRACH transmission.

Figure 7:
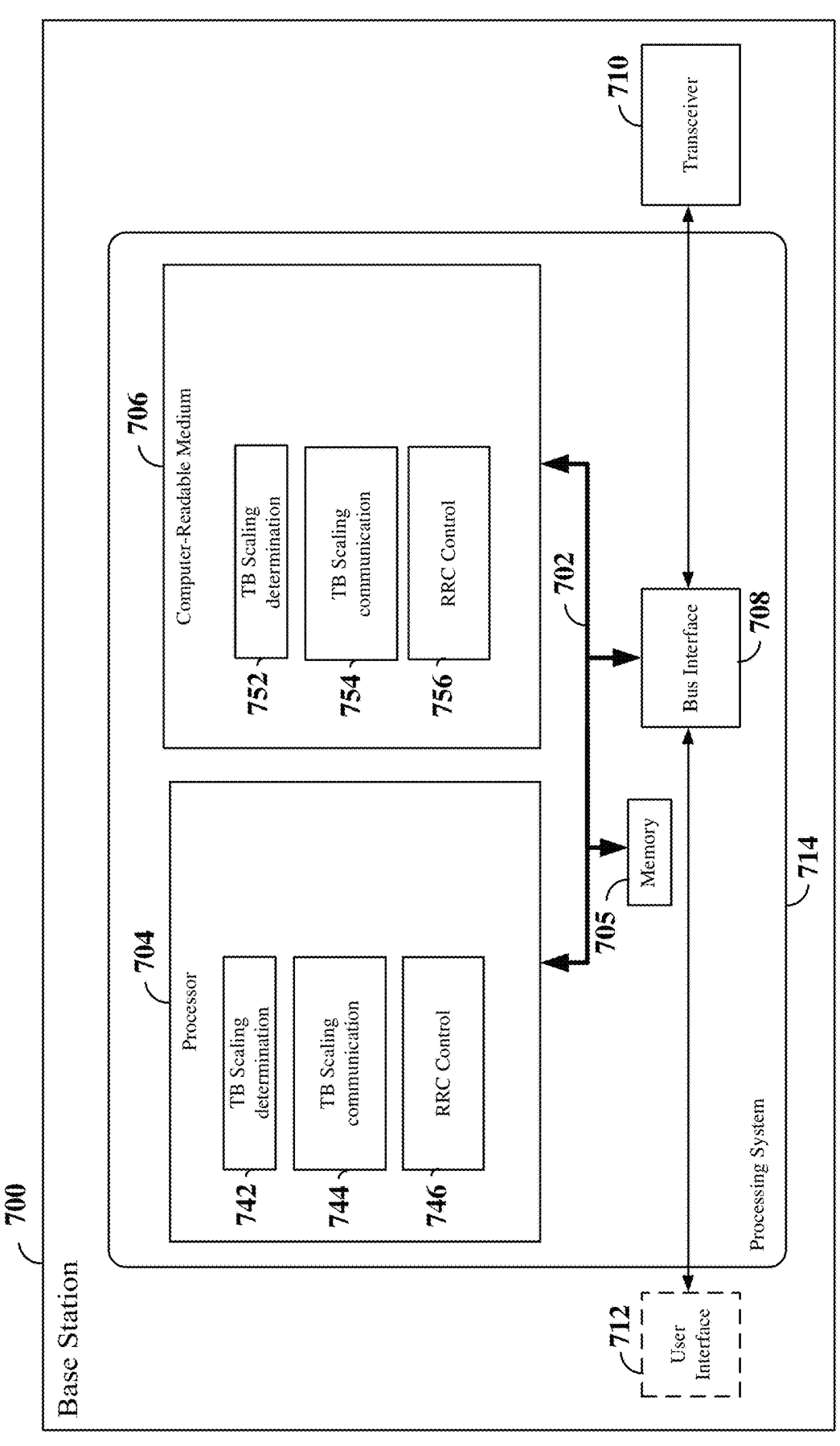
FIG. 7 is a block diagram illustrating an example of a hardware implementation for a base station or gNB employing a processing system according to some aspects.

FIG. 7 is a block diagram illustrating an example of a hardware implementation for a base station 700 employing a processing system 714. For example, the base station 700 may correspond to any of the base stations or gNBs previously discussed herein. In further examples, the base station 700 may be an access point (AP) or remote radio head, or an IEEE 802.11 device such as a Wi-Fi access point, gateway, or router in some examples, or any other device that may utilize various bands such as NR-U bands in the 5 GHz or 6 GHz ranges.

The base station 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station device 700 may be configured to perform any one or more of the functions described herein. That is, the processor 704, as utilized in the base station 700, may be used to implement any one or more of the processes and procedures described below.

In this example, the processing system 714 may be implemented with a bus architecture, represented generally by the bus 702. The bus 702 may include any number of interconnecting buses and bridges depending on the specific application of the processing system 714 and the overall design constraints. The bus 702 links together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further.

A bus interface 708 provides an interface between the bus 702 and a wireless transceiver 710. The wireless transceiver 710 allows for the base station 700 to communicate with various other apparatus over a transmission medium (e.g., air interface). Depending upon the nature of the apparatus, a user interface 712 (e.g., keypad, display, touch screen, speaker, microphone, control knobs, etc.) may also be provided. Of course, such a user interface 712 is optional, and may be omitted in some examples.

The processor 704 is responsible for managing the bus 702 and general processing, including the execution of software stored on the computer-readable medium 706. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 704, causes the processing system 714 to perform the various functions described below for any particular apparatus. The computer-readable medium 706 and the memory 705 may also be used for storing data that is manipulated by the processor 704 when executing software.

The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. In some examples, the computer-readable medium 706 may be part of the memory 705. Those skilled in the art will recognize how best to implement the described functionality presented throughout this disclosure depending on the particular application and the overall design constraints imposed on the overall system.

In some aspects of the disclosure, the processor 704 may include circuitry configured for various functions. For example, the processor 704 may include a transport block (TB) scaling factor determination circuitry 742, which is configured for determining the TB scaling factor or bits as discussed herein. Further, processor 704 may include TB scaling communication circuitry 744 configured to communicate, transmit, or send the TB Scaling information or factor to one or more UEs, for example. Circuitry 744 may, at least in part, cause the base station to send the TB scaling information to a UE as is accomplished in the processes discussed above, as well as the process to be discussed later with respect to FIGS. 8-12. The processor 704 further includes DL traffic and control generation and transmission circuitry 946 for transmitting downlink (DL) data to one or more UEs or relay UEs. Furthermore, the processor 704 may include RRC control circuitry 746 that is configured to effect RRC control and signaling in connection with the methods discussed earlier and as will be discussed with respect to FIGS. 8-12.

The computer-readable medium 706 includes TB scaling determination software/instructions 752 and TB scaling communication software/information 754 to assist the TB scaling determination circuitry 742 and TB scaling communication circuitry 744 in performing their respective functions as described herein. Similarly, the computer readable medium 706 includes RRC control software/information 756 to assist the RRC control circuitry 746 perform its function as described herein.

Figure 8:
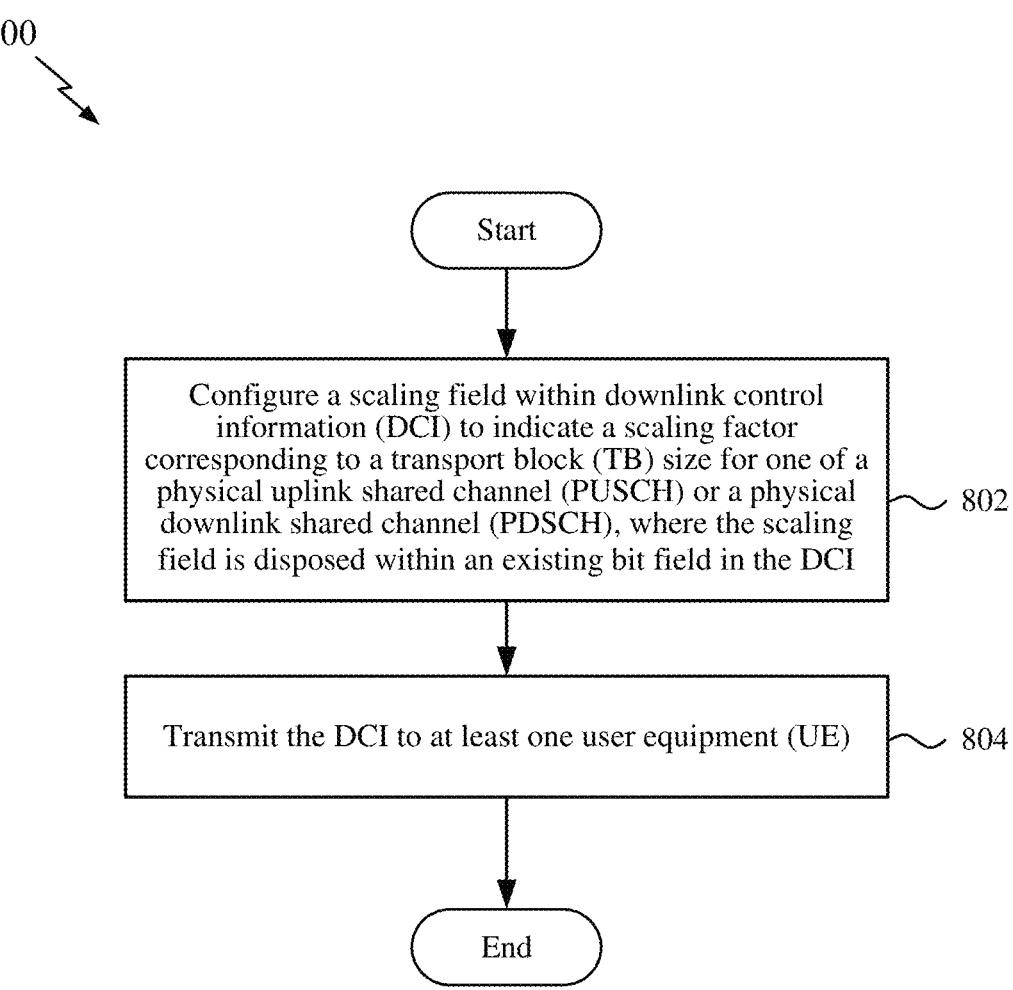
FIG. 8 is a flow diagram of an exemplary method for providing transport block (TB) scaling in a wireless communication system according to some aspects.

FIG. 8 is a flow diagram of an exemplary method 800 for providing transport block (TB) scaling in a wireless communication system. It is noted that method 800 may be implemented within a base station or some other scheduling entity (e.g., an access point). Method 800 includes configuring a scaling field within at least one of downlink control information (DCI) to indicate a scaling factor corresponding to a transport block (TB) size for one of a physical uplink shared channel (PUSCH) or a physical downlink shared channel (PDSCH) as illustrated at block 802. This configuring process in block 802 further includes disposing the scaling field within an existing bit field in the DCI. As an example, the existing bit field may be reserved bits, a DAI, or RVID field as illustrated in FIGS. 4A-C. Moreover, it is noted that this process 802 may be implemented by a base station, such as base station 208 in FIG. 2 or base station 700 in FIG. 7, as a couple examples. Furthermore, the process 802 may be implemented by one or more of circuitry 742 and 744 in FIG. 7, as another example.

Method 800 also includes transmitting the DCI to at least one user equipment (UE) for communication of the TB scaling information to the UE as shown in block 804. This process 804 may be implemented by a base station, such as base station 208 in FIG. 2 or base station 700 in FIG. 7, as a couple examples. Furthermore, the process 804 may be implemented by circuitry 744 and transceiver 710 in FIG. 7, as another example.

According to other aspects, method 800 may include that the RVID field is repurposed for transmission of the scaling field and transmitting a particular identification value of the RVID field to the UE when the RVID field is repurposed for transmission of the scaling field. In further aspects, method 800 may include transmitting a radio resource control (RRC) signal to the UE with a predetermined modulation coding scheme (MCS) threshold that is usable by the UE to cause reinterpreting of the RVID field for TB scaling when the MCS threshold is below a particular value. In still further aspects, method 800 may include transmitting an RRC flag to the UE wherein the RRC flag is configured to indicate to the UE that the RVID field is to be used for TB scaling.

Figure 9:
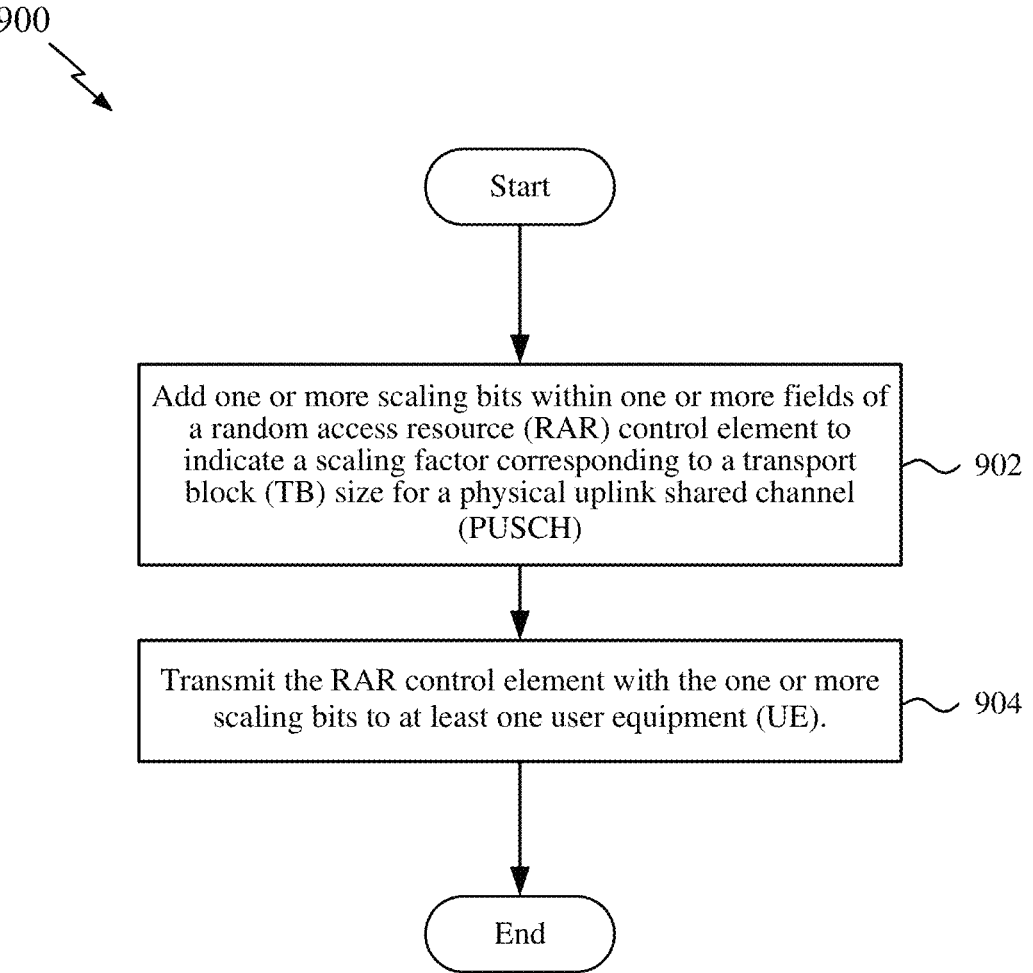
FIG. 9 is a flow diagram of another exemplary method for providing and communicating a transport block (TB) scaling factor in a wireless communication system according to some aspects.

FIG. 9 illustrates a flow diagram of another exemplary method 900 for providing and communicating a transport block (TB) scaling factor in a wireless communication system. It is noted that method 900 may be implemented within a base station or some other scheduling entity (e.g., an access point). Method 900 includes adding one or more scaling bits within one or more fields of a random access resource (RAR) control element to indicate a scaling factor corresponding to a transport block (TB) size for a physical uplink shared channel (PUSCH) as shown in block 902. As an example, the process in block 902 may include either placing bits into existing fields in the UL grant of the RAR as shown in FIG. 5, or into added fields such as shown in FIG. 6. Moreover, it is noted that this process 902 may be implemented by a base station, such as base station 208 in FIG. 2 or base station 700 in FIG. 7, as a couple examples. Furthermore, the process 902 may be implemented by one or more of circuitry 742 and 744 in FIG. 7, as well as RRC control circuitry 746, as another example. Method 900 further includes transmitting the RAR control element with the one or more scaling bits to at least one user equipment (UE) as shown in block 904. The process in block 904 may be implemented, according to one example, by circuitries 744 and 746, as well as transceiver 710 in FIG. 7.

According to further aspects, method 900 may include placing one of the one of more scaling bits in an uplink (UL) grant field of the RAR control element. Moreover, method 900 may include placing one of the one of more scaling bits in a frequency hopping bit location within a first uplink (UL) grant field of the RAR control element, and placing another one of the one of more scaling bits in a frequency domain resource assignment (FDRA) within a second uplink (UL) grant field of the RAR control element. In still another aspect, method 800 may include configuring the RAR control element with an additional control field and placing the one or more scaling bits in the additional control field.

Figure 10:
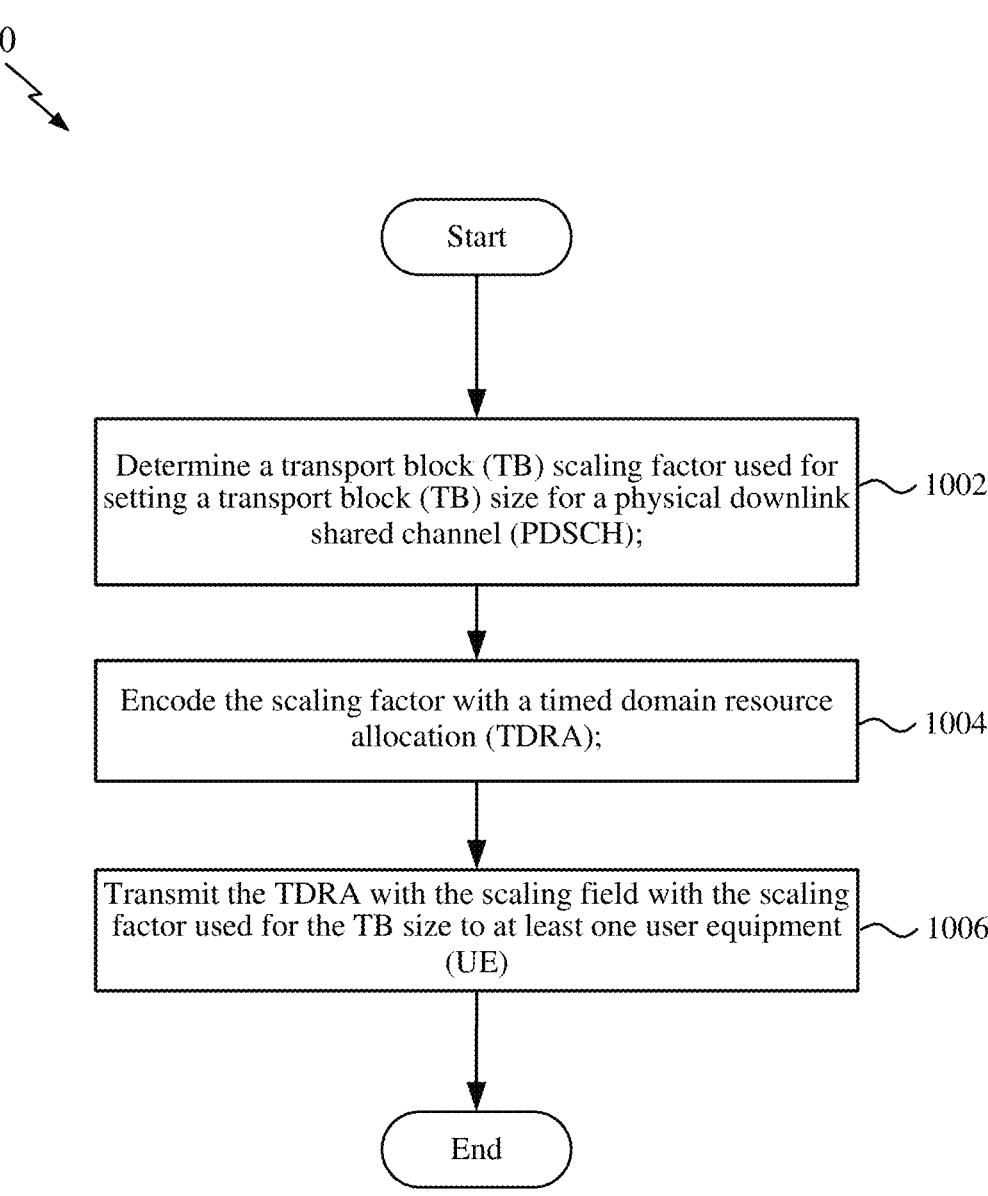
FIG. 10 is a flow diagram of still another exemplary method for providing transport block (TB) scaling in a wireless communication system.

FIG. 10 illustrates a flow diagram of another exemplary method 1000 for providing transport block (TB) scaling in a wireless communication system. It is noted that method 1000 may be implemented within a base station or some other scheduling entity (e.g., an access point). Method 1000 includes determining, in a base station, a transport block (TB) scaling factor used for setting a transport block (TB) size for a physical downlink shared channel (PDSCH) as shown in block 1002. It is noted that this process in block 1002 may be effected by base station 208 or base station 700, as merely two examples. Further, this process 1002 may be effectuated by circuitry 702 and 704 in another example.

Method 1000 further includes encoding the scaling factor with a timed domain resource allocation (TDRA) as shown in block 1004. It is noted that this process in block 1004 may be effected by base station 208 or base station 700, as merely two examples. Further, this process 1002 may be effectuated by circuitry 704 in another example. Method 1000 then further includes transmitting the TDRA with the scaling field with the scaling factor used for setting the TB size to at least one user equipment (UE) as shown at block 1006. This process 1006 may be implemented by a base station, such as base station 208 in FIG. 2 or base station 700 in FIG. 7, as a couple examples. Furthermore, the process 1006 may be implemented by circuitry 744 and transceiver 710 in FIG. 7, as another example.

According to further aspects, method 1000 may include encoding the scaling factor with the TDRA by adding a new entry or changing an existing entry in a TDRA table for a TRDR that is specific to the UE, and adding the TB scaling factor to the new entry or the changed existing entry in the TDRA table. In yet further aspects, method 1000 may include encoding the scaling factor with the TDRA through modifying a default TDRA table using Remaining Minimum System Information (RMSI) to create a new TDRA table with one or more additional entries, and encoding the TB scaling factor in the new TDRA table.

Figure 11:
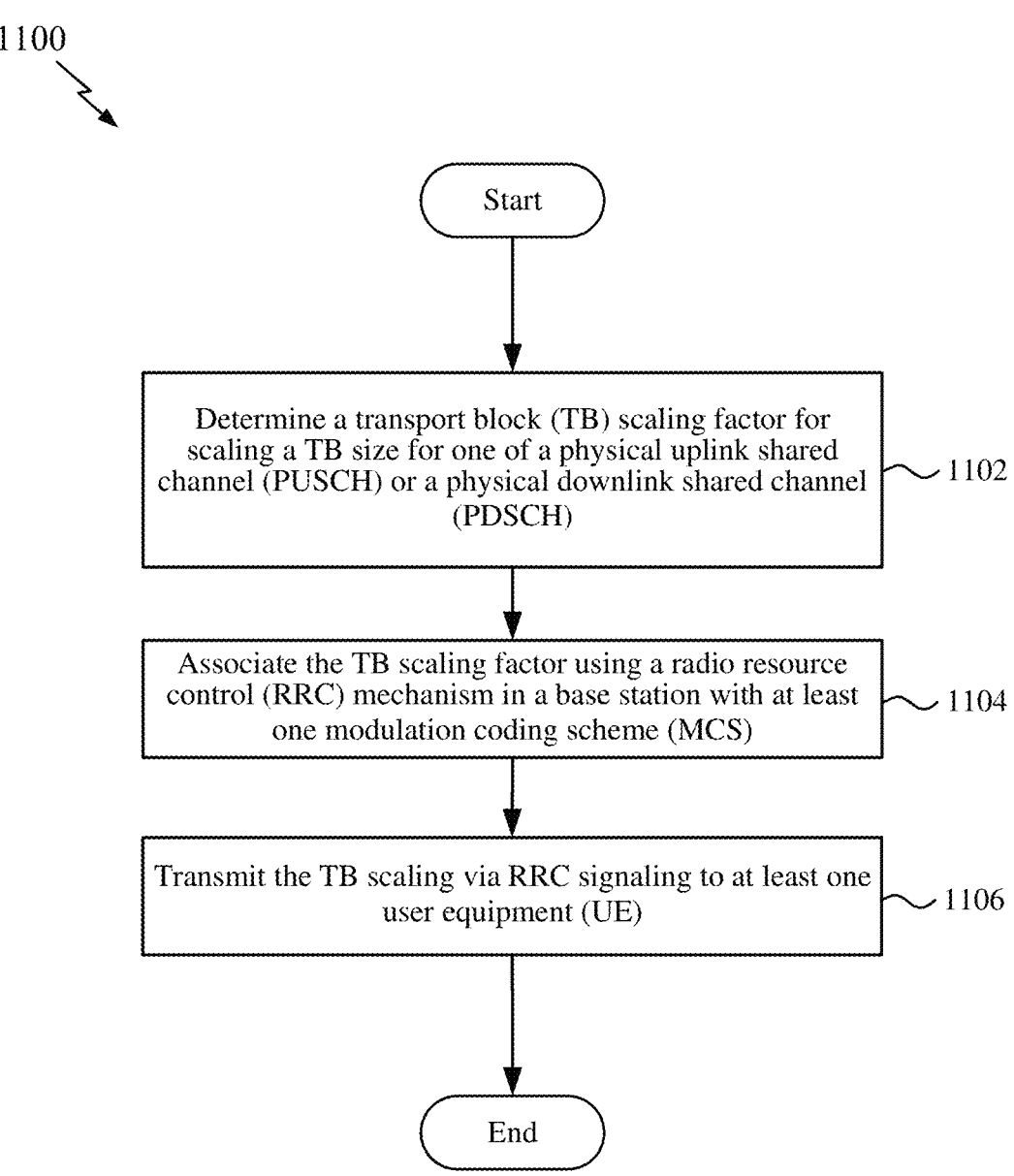
FIG. 11 is a flow diagram of yet another exemplary method for providing transport block (TB) scaling in a wireless communication system.

FIG. 11 illustrates a flow diagram of another exemplary method 1100 for providing transport block (TB) scaling in a wireless communication system. It is noted that method 1100 may be implemented within a base station or some other scheduling entity (e.g., an access point). Method 1000 includes determining a transport block (TB) scaling factor for scaling a TB size for one of a physical uplink shared channel (PUSCH) or a physical downlink shared channel (PDSCH) as shown in block 1102.

Method 1100 further includes associating the TB scaling factor using a radio resource control (RRC) mechanism in the base station with at least one modulation coding scheme (MCS) as shown at block 1104. Moreover, method 1100 includes transmitting the TB scaling via RRC signaling to at least one user equipment (UE) as shown in block 1106.

According to other aspects, method 1100 may include the RRC configured signaling to include signal information block (SIB) signals from the base station to the at least one UE. Moreover, the TB scaling factor may be configured to apply to all PUSCH and PDSCH channels for a plurality of radio network temporary identifiers (RNTIs), and/or apply to all PUSCH and PDSCH channels. Still further, method 1100 may include the TB scaling factor configured to apply to downlink control information (DCI) received in a UE specific search space (USS), but not to a common search space (CSS).

Figure 12:
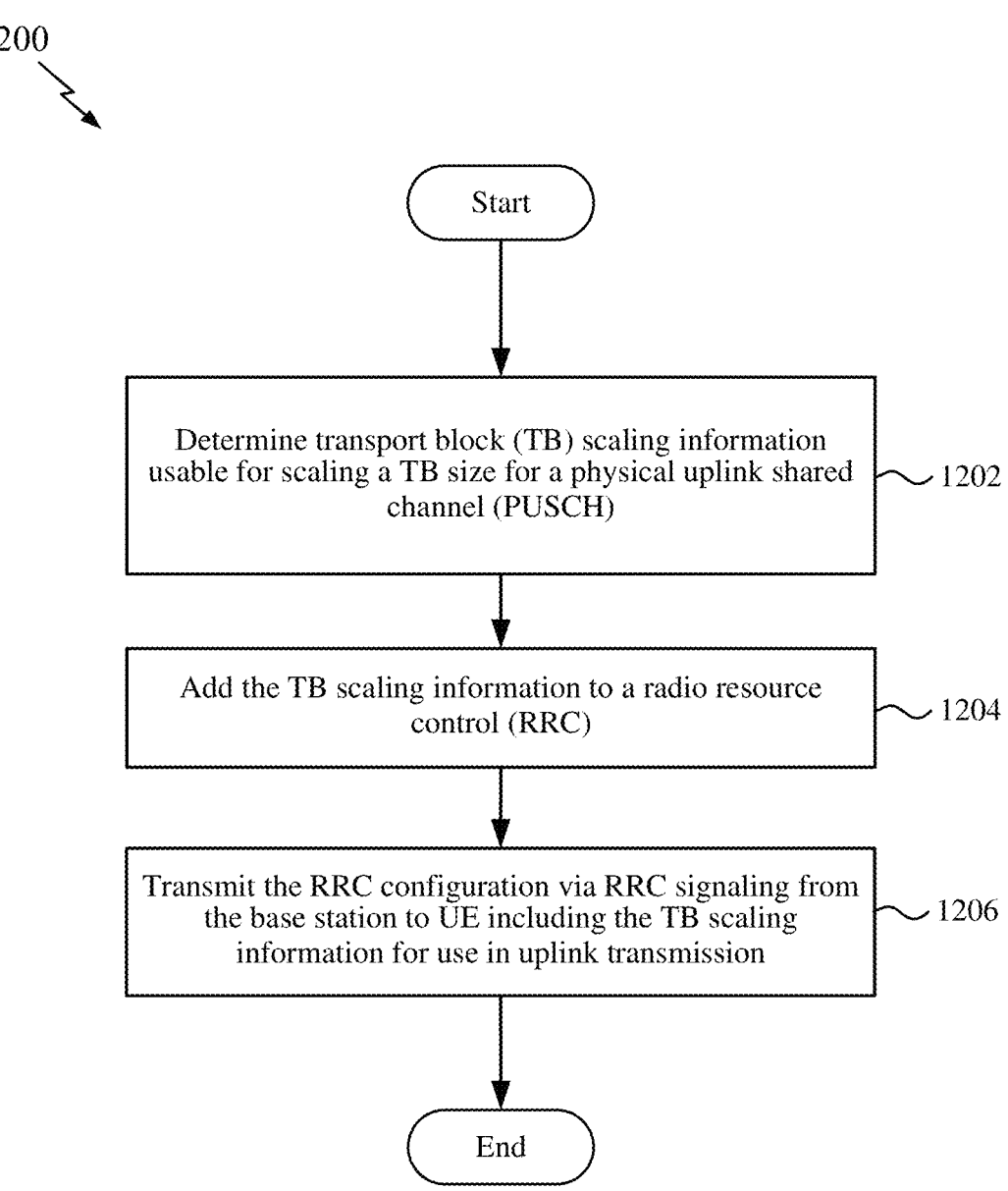
FIG. 12 is a flow diagram of yet another exemplary method for providing transport block (TB) scaling in a wireless communication system.

FIG. 12 illustrates a flow diagram of still another exemplary method 1200 for providing transport block (TB)

scaling in a wireless communication system. Method 1200 includes determining transport block (TB) scaling information within a base station that is usable for scaling a TB size for a physical uplink shared channel (PUSCH) as indicated in block 1202. Further, method 1200 includes adding the TB scaling information to a radio resource control (RRC) configuration as indicated in block 1204. Still further, method 1200 includes transmitting the RRC configuration via RRC signaling from the base station to a user equipment (UE) including the TB scaling information for use in uplink (UL) transmission as shown in block 1206. It is noted that, according to one example, the processes in method 1200 may be implemented by one or more of TB scaling determination circuit 742, TB scaling communication circuitry 744, and RRC control circuitry 746, as well as transceiver 710.

According to further aspects, method 1200 may include adding the TB scaling information to the RRC configuration comprises adding a field in an information element (IE) for a type 1 configured grant (CG). In other aspects, method 1200 may include adding the TB scaling information to the RRC configuration by adding the TB scaling information for a msgA PUSCH configuration that is transmitted by the RRC signaling to the UE, where this RRC signaling may be common RRC signaling in one aspect.

In yet further aspects, method 1200 may include linking the TB scaling information for the msgA PUSCH to a frequency of repetition of the transmission of a physical random access channel (PRACH), wherein a number of PRACH repetitions is correlated to a particular TB scaling factor of the TB scaling information. In still another aspect, method 1200 may include, for an RRC_CONNECTED UE, configuring the TB scaling for the msgA PUSCH using a dedicated RRC signaling, rather than through common RRC signaling.

Figure 13:
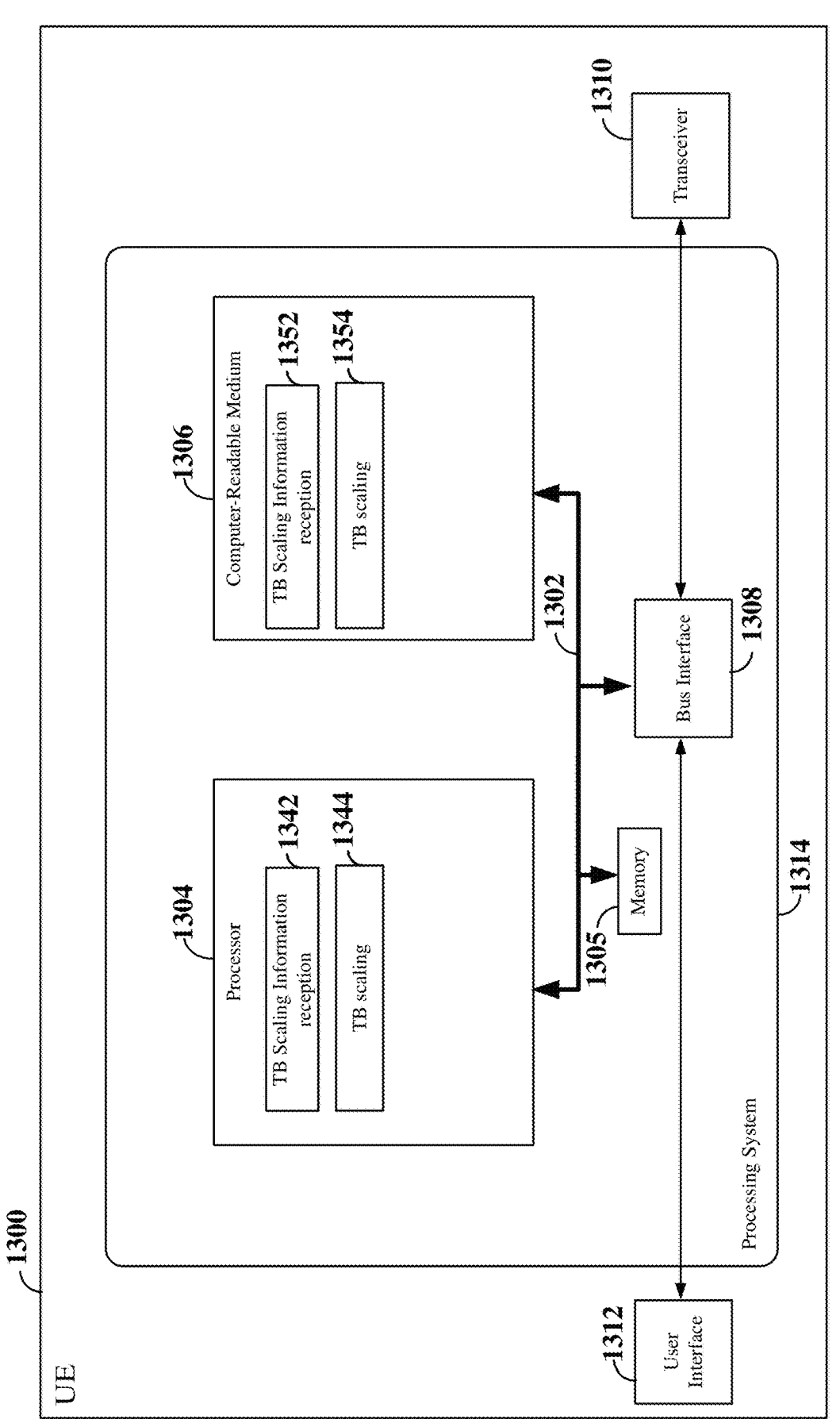
FIG. 13 is a block diagram illustrating an example of a hardware implementation for a UE employing a processing system according to some aspects.

FIG. 13 is a conceptual diagram illustrating an example of a hardware implementation for an exemplary UE 1300 employing a processing system 1314. For example, the UE 1300 may be a UE as illustrated in any one or more of the various examples herein.

The processing system 1314 may be substantially the same as the processing system 714 illustrated in FIG. 7, including a bus interface 1308, a bus 1302, memory 1305, a processor 1304, and a computer-readable medium 1306. Furthermore, the UE 11300 may include a user interface 1312 and a transceiver 1310 substantially similar to those described above in FIG. 7. In accordance with various aspects of the disclosure, an element, or any portion of an element, or any combination of elements may be implemented with the processing system 1314 that includes one or more processors 1304. That is, the processor 1304, as utilized in a UE 1300, may be used to implement any one or more of the processes described below.

In some aspects of the disclosure, the processor 1304 may include circuitry configured for various functions. For example, the processor 1304 may include TB scaling information circuitry 1342 configured to receive the TB scaling information (e.g., TB scaling bits/factors) from a base station, including reception via RRC signaling in some aspects, as well as to decode received TB scaling information in other aspects. The processor 1304 may further include TB scaling circuitry 1344, which may be configured and implement TB scaling based on the received (and decoded) TB scaling information.

The computer-readable medium 1306 includes TB scaling information reception (and decoding) software/instructions 1352 and TB scaling software/instructions 1354 that receive the distributed joint grant (or a portion thereof) to perform their respective functions as previously described. Instructions or software 1352 and 1354 may be respectively used to assist the TB scaling information reception circuitry 1342 and the TB scaling circuitry 1344 in performing its function as previously described.

Figure 14:
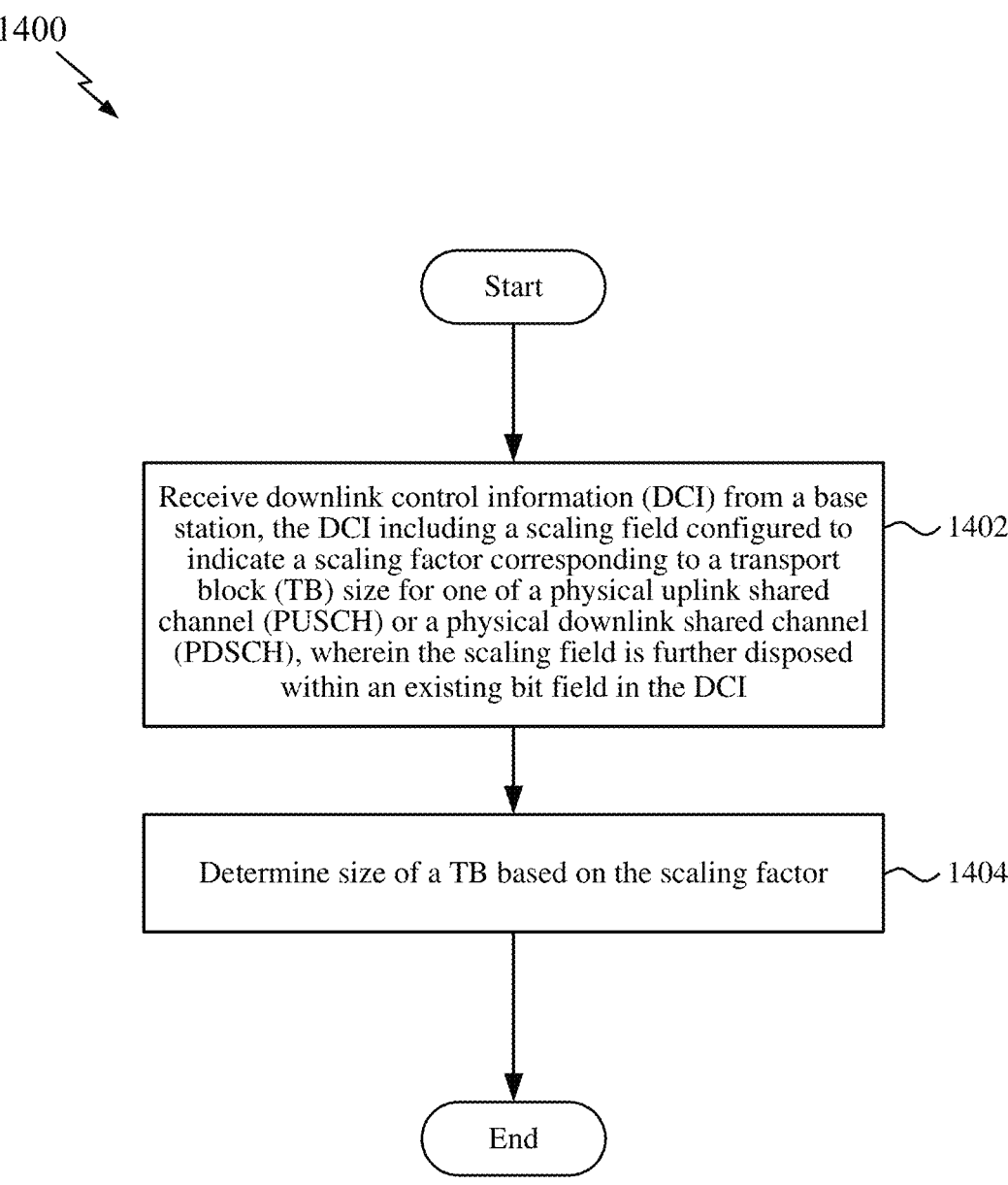
FIG. 14 is a flow chart of an exemplary method for a UE to receive TB scaling information according to some aspects.

FIG. 14 is a flow chart of an exemplary method 1400 for a UE to receive TB scaling information according to some aspects. In examples, method 1400 may be implemented by UE 206 or UE 1300. As illustrated, method 1400 includes receiving downlink control information (DCI) from a base station, the DCI including a scaling field configured to indicate a scaling factor corresponding to a transport block (TB) size for one of a physical uplink shared channel (PUSCH) or a physical downlink shared channel (PDSCH), wherein the scaling field is further disposed within an existing bit field in the DCI as shown in block 1402. Additionally, method 1400 includes determining a size of a transport block based on the scaling factor as shown in block 1404.

Figure 15:
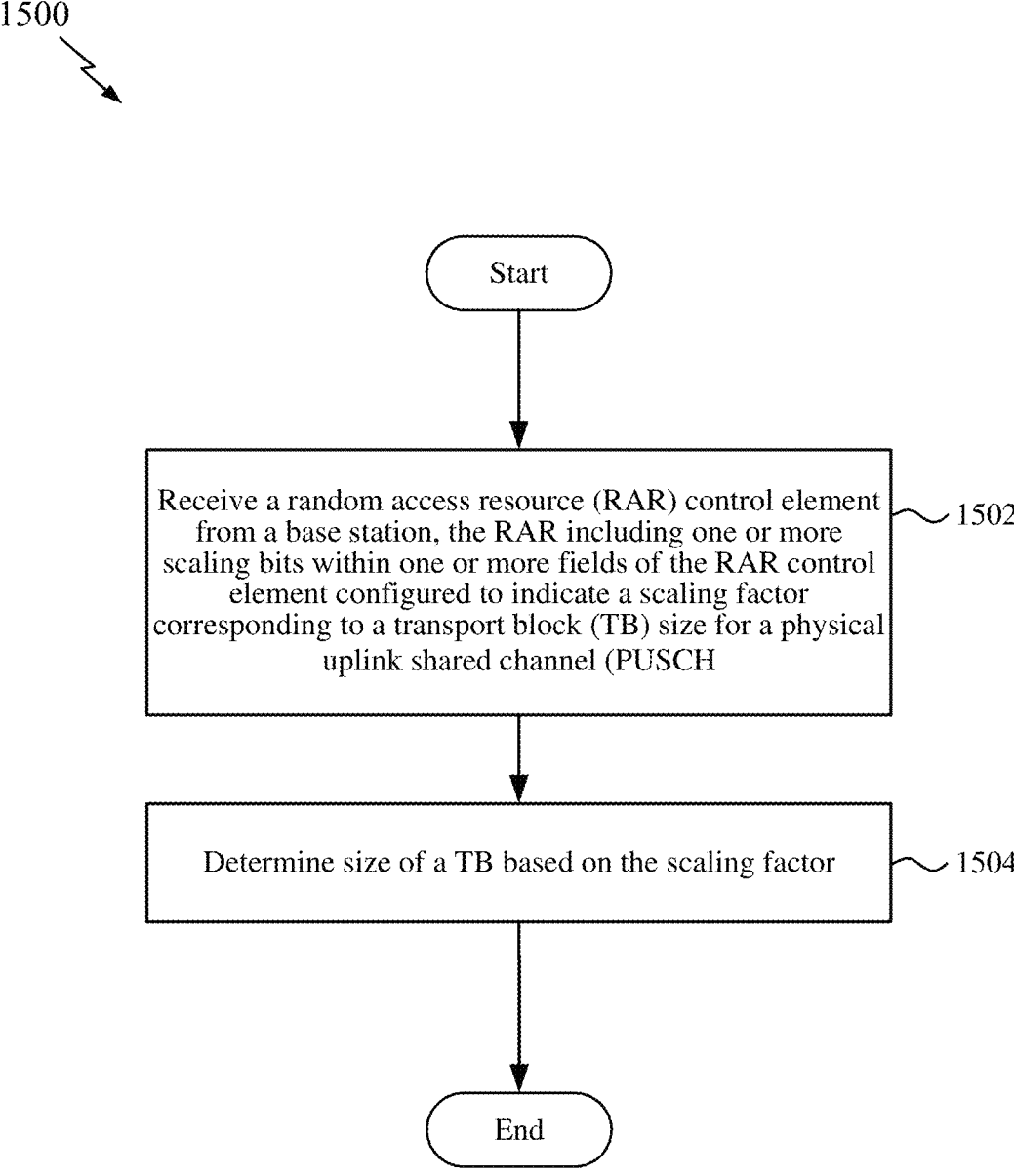
FIG. 15 is a flow chart of another exemplary method for a UE to receive TB scaling information according to some aspects.

FIG. 15 is a flow chart of another exemplary method 1500 for a UE to receive TB scaling information according to some aspects. In examples, method 1500 may be implemented by UE 206 or UE 1300. Method 1500 includes receiving a random access resource (RAR) control element from a base station, the RAR including one or more scaling bits within one or more fields of the RAR control element configured to indicate a scaling factor corresponding to a transport block (TB) size for a physical uplink shared channel (PUSCH) as shown in block 1502. Further, method 1500 includes determining a size of a transport block based on the scaling factor as shown in block 1504.

Figure 16:
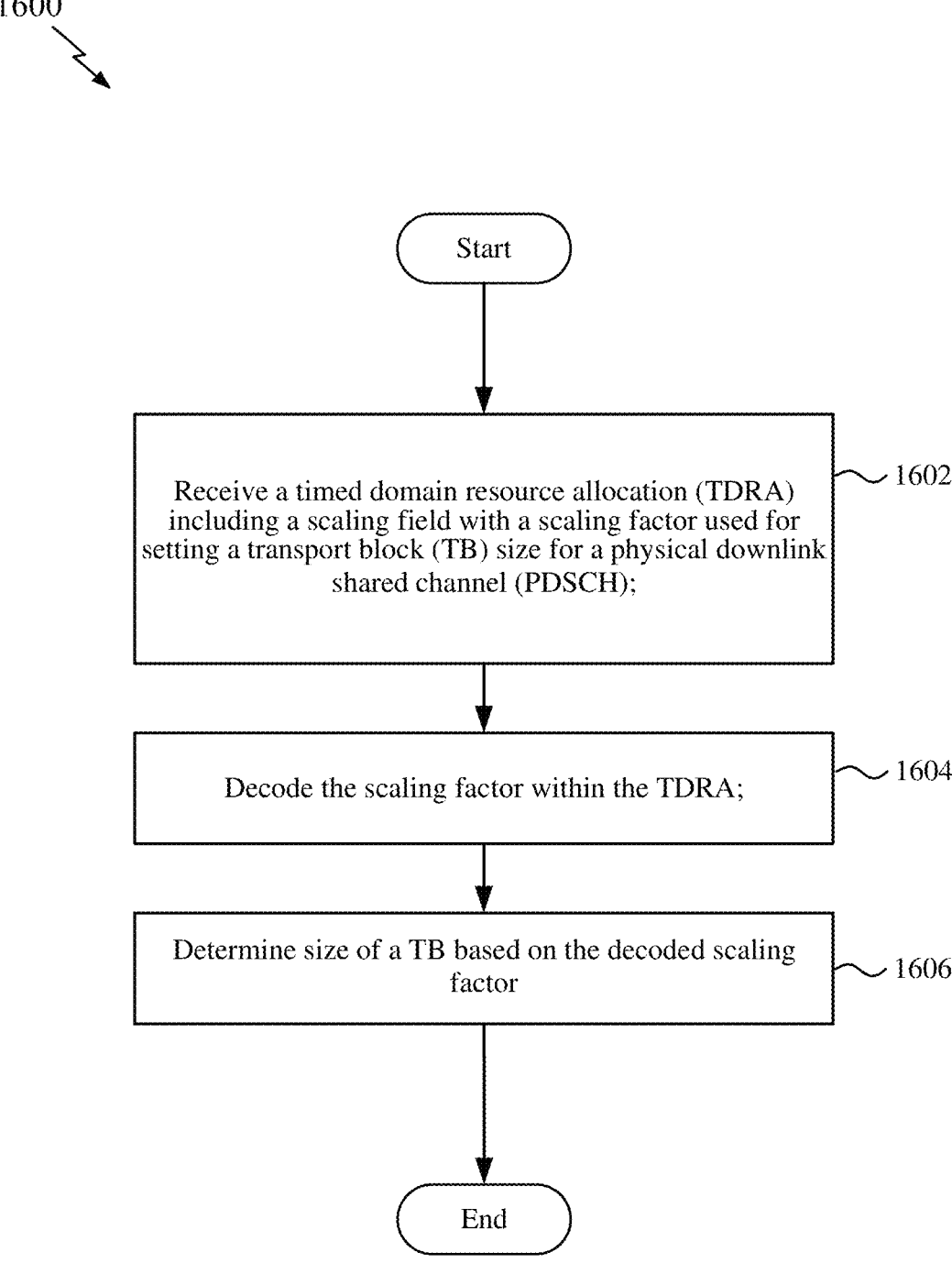
FIG. 16 is a flow chart of yet another exemplary method for a UE to receive TB scaling information according to some aspects.

FIG. 16 is a flow chart of yet another exemplary method 1600 for a UE to receive TB scaling information according to some aspects. In examples, method 1600 may be implemented by UE 206 or UE 1300. Method 1600 includes receiving a timed domain resource allocation (TDRA), the TDRA including a scaling field with a scaling factor used for setting a transport block (TB) size for a physical downlink shared channel (PDSCH) as shown in block 1602. Further, method 1600 includes decoding the scaling factor within the TDRA as indicated at block 1604. Finally, method 1600 includes determining a size of a TB based on the decoded scaling factor as shown in block 1606.

Figure 17:
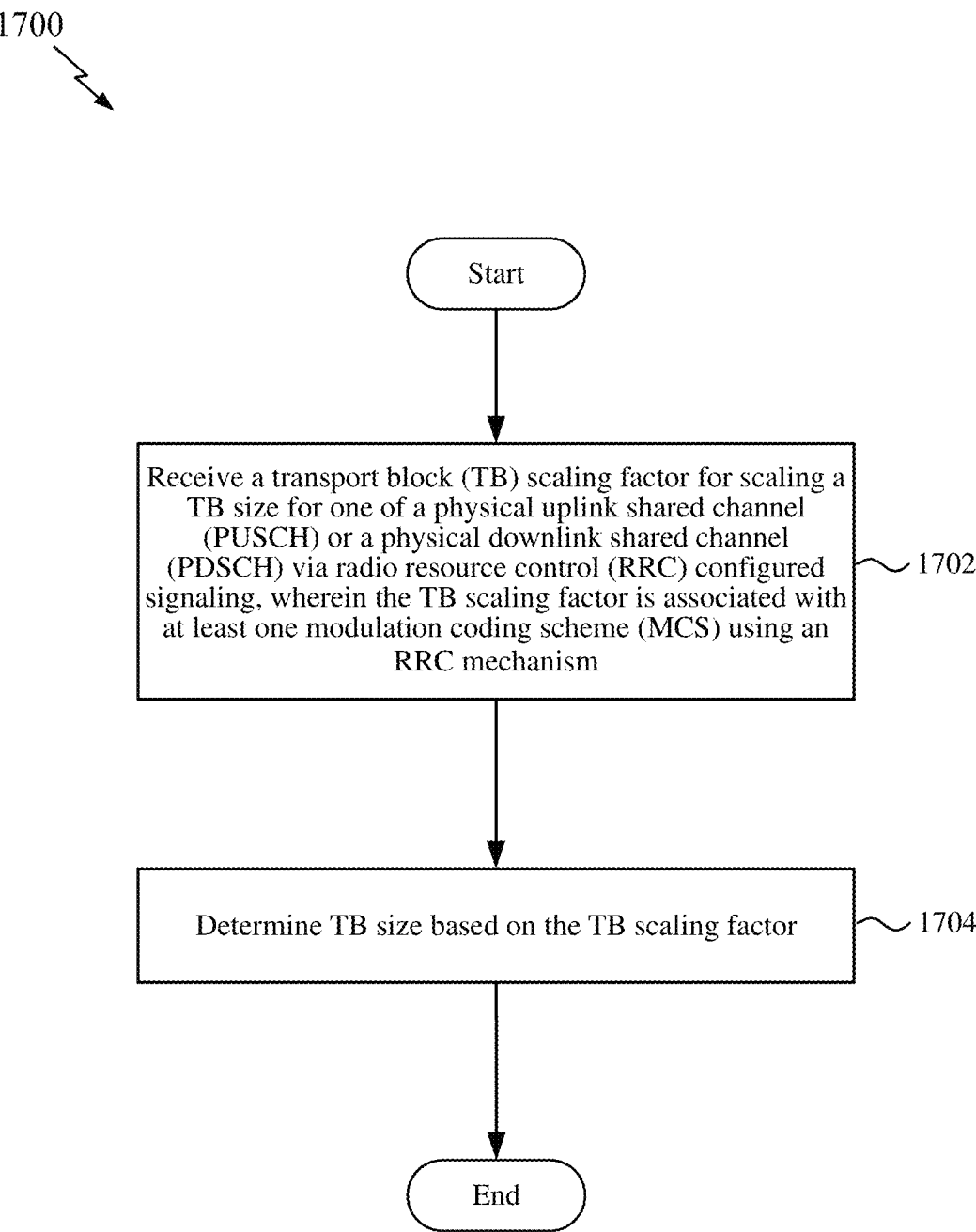
FIG. 17 is a flow chart of still another exemplary method for a UE to receive TB scaling information according to some aspects.

FIG. 17 is a flow chart of still another exemplary method 1700 for a UE to receive TB scaling information according to some aspects. In examples, method 1700 may be implemented by UE 206 or UE 1300. Method 1700 include receiving from a base station a transport block (TB) scaling factor for scaling a TB size for one of a physical uplink shared channel (PUSCH) or a physical downlink shared channel (PDSCH) via radio resource control (RRC) configured signaling, wherein the TB scaling factor is associated with at least one modulation coding scheme (MCS) using an RRC mechanism as shown in block 1702. Furthermore, method 1700 includes determining a TB size based on the TB scaling factor received via the RRC configured signaling as shown in block 1704.

Figure 18:
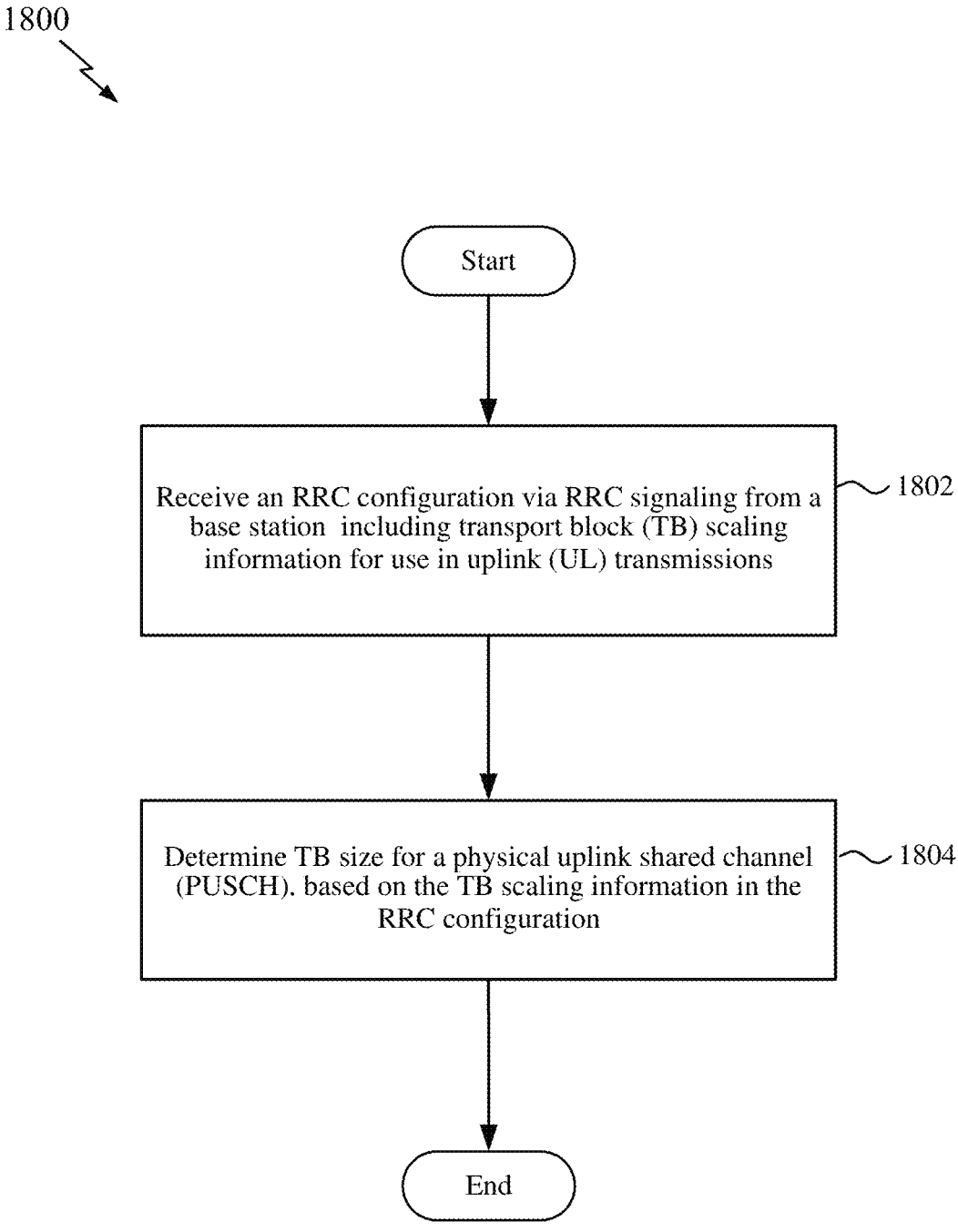
FIG. 18 is a flow chart of yet one more exemplary method for a UE to receive TB scaling information according to some aspects.

FIG. 18 is a flow chart of still another exemplary method 1800 for a UE to receive TB scaling information according to some aspects. In some examples, method 1700 may be implemented by UE 206 or UE 1300. Method 1800 features receiving an RRC configuration via RRC signaling from a base station including transport block (TB) scaling information for use in uplink (UL) transmissions as shown in block 1802. Furthermore, method 1800 includes determining a TB size for a physical uplink shared channel (PUSCH). based on the TB scaling information in the RRC configuration as shown in block 1804.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIG. 1, 2, 7, or 13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The following provides an overview of aspects of the present disclosure:

Aspect 1: A method of wireless communication at a base station in a wireless communication network, the method comprising: configuring a scaling field within downlink control information (DCI) to indicate a scaling factor corresponding to a transport block (TB) size for one of a physical uplink shared channel (PUSCH) or a physical downlink shared channel (PDSCH), wherein the scaling field is disposed within an existing bit field in the DCI; and transmitting the DCI to at least one user equipment (UE).

Aspect 2: The method of aspect 1, wherein the existing bit field comprises a portion of reserved bits in a system information radio network temporary identifier (SI-RNTI).

Aspect 3: The method of aspect 1, wherein the existing bit field comprises a downlink assignment index (DAI) field in a temporary cell RNTI (TC-RNTI).

Aspect 4: The method of aspect 1, wherein the existing bit field comprises a two bit redundancy version identifier (RVID) field.

Aspect 5: The method of aspect 4, wherein the RVID field is repurposed for transmission of the scaling field and the method further comprises transmitting a particular identification value of the RVID field to the UE when the RVID field is repurposed for transmission of the scaling field.

Aspect 6: The method of aspect 4, further comprising: transmitting a radio resource control (RRC) signal to the UE with a predetermined modulation coding scheme (MCS) threshold that is usable by the UE to cause reinterpreting of the RVID field for TB scaling when the MCS threshold is below a particular value.

Aspect 7: The method of aspect 4, further comprising: transmitting an RRC flag to the UE wherein the RRC flag is configured to indicate to the UE that the RVID field is to be used for TB scaling.

Aspect 8: A method of wireless communication at a base station in a wireless communication network, the method comprising: adding one or more scaling bits within one or more fields of a random access resource (RAR) control element to indicate a scaling factor corresponding to a transport block (TB) size for a physical uplink shared channel (PUSCH); and transmitting the RAR control element with the one or more scaling bits to at least one user equipment (UE).

Aspect 9: The method of aspect 8, further comprising: placing one of the one of more scaling bits in an uplink (UL) grant field of the RAR control element.

Aspect 10: The method of aspect 8, further comprising: placing one of the one of more scaling bits in a frequency hopping bit location within a first uplink (UL) grant field of the RAR control element; and placing another one of the one of more scaling bits in a frequency domain resource assignment (FDRA) within a second uplink (UL) grant field of the RAR control element.

Aspect 11: The method of aspect 8, further comprising: configuring the RAR control element with an additional control field; and placing the one or more scaling bits in the additional control field.

Aspect 12: A method of wireless communication at a base station in a wireless communication network, the method comprising: determining a transport block (TB) scaling factor used for setting a transport block (TB) size for a physical downlink shared channel (PDSCH); encoding the scaling factor with a timed domain resource allocation (TDRA); and transmitting the TDRA with the scaling field with the scaling factor used for the TB size to at least one user equipment (UE).

Aspect 13: The method of aspect 12, wherein encoding the scaling factor with the TDRA comprises: adding a new entry or changing an existing entry in a TDRA table for a TRDR that is specific to the UE; and adding the TB scaling factor to the new entry or the changed existing entry in the TDRA table.

Aspect 14: The method of aspect 12, wherein the encoding scaling factor with the TDRA comprises: modifying a default TDRA table using Remaining Minimum System Information (RMSI) to create a new TDRA table with one or more additional entries; and encoding the TB scaling factor in the new TDRA table.

Aspect 15: A method of wireless communication at a base station in a wireless communication network, the method comprising: determining a transport block (TB) scaling factor for scaling a TB size for one of a physical uplink shared channel (PUSCH) or a physical downlink shared channel (PDSCH); associating the TB scaling factor using a radio resource control (RRC) mechanism in the base station with at least one modulation coding scheme (MCS); and transmitting the TB scaling via RRC configured signaling to at least one user equipment (UE).

Aspect 16: The method of aspect 15, wherein the RRC configured signaling includes signal information block (SIB) signals from the base station to the at least one UE.

Aspect 17: The method of aspect 15, wherein the TB scaling factor is configured to apply to all PUSCH and PDSCH channels for a plurality of radio network temporary identifiers (RNTIs).

Aspect 18: The method of aspect 15, wherein the TB scaling factor is configured to apply to downlink control information (DCI) received in a UE specific search space (USS).

Aspect 19: A method of wireless communication at a base station in a wireless communication network: determining transport block (TB) scaling information usable for scaling a TB size for a physical uplink shared channel (PUSCH); adding the TB scaling information to a radio resource control (RRC) configuration; and transmitting the RRC configuration via RRC signaling from the base station to a user equipment (UE) including the TB scaling information for use in uplink (UL) transmission.

Aspect 20: The method of aspect 19, wherein adding the TB scaling information to the RRC configuration comprises adding a field in an information element (IE) for a type 1 configured grant (CG).

Aspect 21: The method of aspect 19, wherein adding the TB scaling information to the RRC configuration comprises adding the TB scaling information for a msgA PUSCH configuration that is transmitted by the RRC signaling to the UE.

Aspect 22: The method of aspect 21, further comprising: linking the TB scaling information for the msgA PUSCH to a frequency of repetition of the transmission of a physical random access channel (PRACH), wherein a number of PRACH repetitions is correlated to a particular TB scaling factor of the TB scaling information.

Aspect 23: The method of aspect 21, further comprising: for an RRC_CONNECTED UE, configuring TB scaling for the msgA PUSCH using a dedicated RRC signaling.

Aspect 24: A method for wireless communication at a user equipment (UE) in a wireless communication network, the method comprising: receiving downlink control information (DCI) from a base station, the DCI including a scaling field configured to indicate a scaling factor corresponding to a transport block (TB) size for one of a physical uplink shared channel (PUSCH) or a physical downlink shared channel (PDSCH), wherein the scaling field is further disposed within an existing bit field in the DCI; and determining a size of a transport block based on the scaling factor.

Aspect 25: The method of aspect 24: wherein the existing bit field comprises a portion of reserved bits in a system information radio network temporary identifier (SI-RNTI).

Aspect 26: The method of aspect 24, wherein the existing bit field comprises a downlink assignment index (DAI) field in a temporary cell RNTI (TC-RNTI).

Aspect 27: The method of aspect 24, wherein the existing bit field comprises a two bit redundancy version identifier (RVID) field.

Aspect 28: The method of aspect 27, wherein the RVID field is repurposed for transmission of the scaling field and the method further comprises transmitting a particular identification value of the RVID field to the UE when the RVID field is repurposed for transmission of the scaling field.

Aspect 29: The method of aspect 27, further comprising: receiving a radio resource control (RRC) signal from the base station with a predetermined modulation coding scheme (MCS) threshold that is usable by the UE to cause reinterpreting of the RVID field for TB scaling when the MCS threshold is below a particular value.

Aspect 30: The method of aspect 27, further comprising: receiving an RRC flag from the base station, wherein the RRC flag is configured to indicate to the UE that the RVID field is to be used for TB scaling.

Aspect 31: A method of wireless communication at a UE in a wireless communication network, the method comprising: receiving a random access resource (RAR) control element from a base station, the RAR including one or more scaling bits within one or more fields of the RAR control element configured to indicate a scaling factor corresponding to a transport block (TB) size for a physical uplink shared channel (PUSCH); and determining a size of a transport block based on the scaling factor.

Aspect 32: The method of aspect 31, wherein one of the one of more scaling bits is located in an uplink (UL) grant field of the RAR control element.

Aspect 33: The method of aspect 31, further comprising: one of the one of more scaling bits located in a frequency hopping bit location within a first uplink (UL) grant field of the RAR control element; and another one of the one of more scaling bits located in a frequency domain resource assignment (FDRA) within a second uplink (UL) grant field of the RAR control element.

Aspect 34: The method of aspect 31, further comprising: the RAR control element configured with an additional control field; and the one or more scaling bits located in the additional control field.

Aspect 35: A method of wireless communication at a user equipment (UE) in a wireless communication network, the method comprising: receiving a timed domain resource allocation (TDRA), the TDRA including a scaling field with a scaling factor used for setting a transport block (TB) size for a physical downlink shared channel (PDSCH); decoding the scaling factor within the TDRA; and determining a size of a TB based on the decoded scaling factor.

Aspect 36: The method of aspect 35, wherein the scaling factor is encoded within the received TDRA by adding a new entry or changing an existing entry in a TDRA table for a TRDR that is specific to the UE, and adding the TB scaling factor to the new entry or the changed existing entry in the TDRA table.

Aspect 37: The method of aspect 35, wherein the scaling factor is encoded within the received TDRA by modifying a default TDRA table using Remaining Minimum System Information (RMSI) to create a new TDRA table with one or more additional entries, and encoding the TB scaling factor in the new TDRA table.

Aspect 38: A method of wireless communication at a user equipment (UE) in a wireless communication network, the method comprising: receiving from a base station a transport block (TB) scaling factor for scaling a TB size for one of a physical uplink shared channel (PUSCH) or a physical downlink shared channel (PDSCH) via radio resource control (RRC) configured signaling, wherein the TB scaling factor is associated with at least one modulation coding scheme (MCS) using an RRC mechanism; and determining a TB size based on the TB scaling factor.

Aspect 39: The method of aspect 38, wherein the RRC configured signaling includes signal information block (SIB) signals from the base station.

Aspect 40: The method of aspect 38, wherein the TB scaling factor is configured to apply to all PUSCH and PDSCH channels for a plurality of radio network temporary identifiers (RNTIs).

Aspect 41: The method of aspect 38, wherein the TB scaling factor is configured to apply to downlink control information (DCI) received in a UE specific search space (USS).

Aspect 42: A method of wireless communication at a user equipment (UE) in a wireless communication network: receiving an RRC configuration via RRC signaling from a base station including transport block (TB) scaling information for use in uplink (UL) transmissions; and determining a TB size for a physical uplink shared channel (PUSCH). based on the TB scaling information in the RRC configuration.

Aspect 43: The method of aspect 42, wherein adding the TB scaling information to the RRC configuration comprises adding a field in an information element (IE) for a type 1 configured grant (CG).

Aspect 44: The method of aspect 42, wherein adding the TB scaling information to the RRC configuration comprises adding the TB scaling information for a msgA PUSCH configuration that is transmitted by the RRC configuration to the UE.

Aspect 45: The method of aspect 44, further comprising: linking the TB scaling information for the msgA PUSCH to a frequency of repetition of the transmission of a physical random access channel (PRACH), wherein a number of PRACH repetitions is correlated to a particular TB scaling factor of the TB scaling information.

Aspect 46: The method of aspect 44, further comprising: for an RRC_CONNECTED UE, configuring TB scaling for the msgA PUSCH using a dedicated RRC signaling.

Aspect 47: A user equipment (UE) configured for wireless communication, comprising: a processor; a memory communicatively coupled to the processor; and a transceiver communicatively coupled to the processor, wherein the processor and the memory are configured to implement a method of any of aspects 24-51.

Aspect 48: A base station configured for wireless communication, comprising: a processor; a memory communicatively coupled to the processor; and a transceiver communicatively coupled to the processor, wherein the processor and the memory are configured to implement a method of any of aspects 1-23.

Aspect 49: A user equipment (UE) configured for wireless communication, comprising: means for implementing a method of any of aspects 24-51.

Aspect 50: A base station configured for wireless communication, comprising: means for implementing a method of any of aspects 1-23.

Aspect 51: A computer readable medium storing computer executable code comprising instructions for implementing a method of any of aspects 1-51.

The invention claimed is:

1. A method of wireless communication at a base station in a wireless communication network, the method comprising:

configuring a scaling field within downlink control information (DCI) to indicate a scaling factor corresponding to a transport block (TB) size for one of a physical uplink shared channel (PUSCH) or a physical downlink shared channel (PDSCH), wherein the scaling field is disposed within an existing bit field in the DCI, wherein the existing bit field comprises a two bit redundancy version identifier (RVID) field and wherein the RVID field is repurposed for transmission of the scaling field;

transmitting the DCI to at least one user equipment (UE); and transmitting a particular identification value of the RVID field to the UE when the RVID field is repurposed for transmission of the scaling field.

2. The method of claim 1, wherein the existing bit field comprises a portion of reserved bits in a system information radio network temporary identifier (SI-RNTI).

3. The method of claim 1, wherein the existing bit field comprises a downlink assignment index (DAI) field in a temporary cell RNTI (TC-RNTI).

4. The method of claim 1, further comprising:

transmitting a radio resource control (RRC) signal to the UE with a predetermined modulation coding scheme (MCS) threshold that is usable by the UE to cause reinterpreting of the RVID field for TB scaling when the MCS threshold is below a particular value.

5. The method of claim 1, further comprising:

transmitting an RRC flag to the UE wherein the RRC flag is configured to indicate to the UE that the RVID field is to be used for TB scaling.

6. A method of wireless communication at a base station in a wireless communication network, the method comprising:

determining a transport block (TB) scaling factor used for setting a transport block (TB) size for a physical downlink shared channel (PDSCH);

encoding the scaling factor with a timed domain resource allocation (TDRA);

transmitting the TDRA with the scaling field with the scaling factor used for the TB size to at least one user equipment (UE), wherein the scaling field is disposed within an existing bit field in the DCI, wherein the existing bit field comprises a two bit redundancy version identifier (RVID) field and wherein the RVID field is repurposed for transmission of the scaling field; and transmitting a particular identification value of the R VID field to the UE when the RVID field is repurposed for transmission of the scaling field.

7. The method of claim 6, wherein encoding the scaling factor with the TDRA comprises:

adding a new entry or changing an existing entry in a TDRA table for a TRDR that is specific to the UE; and adding the TB scaling factor to the new entry or the changed existing entry in the TDRA table.

8. The method of claim 6, wherein encoding the scaling factor with the TDRA comprises:

modifying a default TDRA table using Remaining Minimum System Information (RMSI) to create a new TDRA table with one or more additional entries; and encoding the TB scaling factor in the new TDRA table.

9. A method for wireless communication at a user equipment (UE) in a wireless communication network, the method comprising:

receiving downlink control information (DCI), a random access resource (RAR) control element, radio resource control (RRC) configured signaling, or an RRC configuration from a base station, the DCI, the RAR control element, the RRC configured signaling, or the RRC configuration including scaling bits configured to indicate a scaling factor corresponding to a transport block (TB) size for one of a physical uplink shared channel (PUSCH) or a physical downlink shared channel (PDSCH), wherein the scaling bits are further disposed within an existing bit field in the DCI, wherein the existing bit field comprises a two bit redundancy version identifier (RVID) field and wherein the RVID field is repurposed for transmission of the scaling field and the method further comprises transmitting a particular identification value of the RVID field to the UE when the RVID field is repurposed for transmission of the scaling field; and determining a size of a transport block based on the scaling bits.

10. The method of claim 9, wherein the existing bit field comprises a portion of reserved bits in a system information radio network temporary identifier (SI-RNTI).

11. The method of claim 9, wherein the existing bit field comprises a downlink assignment index (DAI) field in a temporary cell RNTI (TC-RNTI).

12. The method of claim 9, further comprising:

receiving a radio resource control (RRC) signal from the base station with a predetermined modulation coding scheme (MCS) threshold that is usable by the UE to cause reinterpreting of the RVID field for TB scaling when the MCS threshold is below a particular value.

13. The method of claim 9, further comprising:

receiving an RRC flag from the base station, wherein the RRC flag is configured to indicate to the UE that the RVID field is to be used for TB scaling.

14. The method of claim 9, wherein one of the one of more scaling bits is located in an uplink (UL) grant field of the RAR control element.

15. The method of claim 9, further comprising:

one of the one of more scaling bits located in a frequency hopping bit location within a first uplink (UL) grant field of the RAR control element; and another one of the one of more scaling bits located in a frequency domain resource assignment (FDRA) within a second uplink (UL) grant field of the RAR control element.

16. The method of claim 9, further comprising:

the RAR control element configured with an additional control field; and the one or more scaling bits located in the additional control field.

17. The method of claim 9, wherein the RRC configured signaling includes signal information block (SIB) signals from the base station.

18. The method of claim 9, wherein the TB scaling factor is configured to apply to all PUSCH and PDSCH channels for a plurality of radio network temporary identifiers (RN-TIs).

19. The method of claim 9, wherein the TB scaling factor is configured to apply to downlink control information (DCI) received in a UE specific search space (USS).

20. The method of claim 9, wherein adding the TB scaling information to the RRC configuration comprises adding a field in an information element (IE) for a type 1 configured grant (CG).

21. The method of claim 9, wherein adding the TB scaling information to the RRC configuration comprises adding the TB scaling information for a msgA PUSCH configuration that is transmitted by the RRC configuration to the UE.

22. The method for wireless communication of claim 21, further comprising:

linking the TB scaling information for the msgA PUSCH to a frequency of repetition of the transmission of a physical random access channel (PRACH), wherein a number of PRACH repetitions is correlated to a particular TB scaling factor of the TB scaling information.

23. The method of claim 21, further comprising:

for an RRC CONNECTED UE, configuring TB scaling for the msgA PUSCH using a dedicated RRC signaling.

* * * * *